United States Patent
Yatsugi et al.

(10) Patent No.: US 10,800,444 B2
(45) Date of Patent: Oct. 13, 2020

(54) ELECTRIC DRIVING DEVICE AND ELECTRIC POWER STEERING DEVICE

(71) Applicant: HITACHI AUTOMOTIVE SYSTEMS, LTD., Hitachinaka-shi, Ibaraki (JP)

(72) Inventors: Tomishige Yatsugi, Hitachinaka (JP); Toshihiko Sakai, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 403 days.

(21) Appl. No.: 15/757,863

(22) PCT Filed: Jul. 22, 2016

(86) PCT No.: PCT/JP2016/071484
§ 371 (c)(1),
(2) Date: Mar. 6, 2018

(87) PCT Pub. No.: WO2017/043193
PCT Pub. Date: Mar. 16, 2017

(65) Prior Publication Data
US 2020/0023886 A1    Jan. 23, 2020

(30) Foreign Application Priority Data

Sep. 7, 2015   (JP) ................ 2015-175831

(51) Int. Cl.
*H02K 11/33*    (2016.01)
*H02K 7/02*    (2006.01)
(Continued)

(52) U.S. Cl.
CPC .......... *B62D 5/046* (2013.01); *B62D 5/0406* (2013.01); *B62D 5/0424* (2013.01); *H02K 11/33* (2016.01); *H02K 2211/03* (2013.01)

(58) Field of Classification Search
CPC ............. H02K 5/04; H02K 11/33; H02K 7/02
(Continued)

(56) References Cited

U.S. PATENT DOCUMENTS

2003/0173839 A1    9/2003  Torii et al.
2008/0067960 A1*   3/2008  Maeda ................... B62D 5/046
                                                   318/400.02
(Continued)

FOREIGN PATENT DOCUMENTS

JP    2004-040877 A    2/2004
JP    2008-118753 A    5/2008
(Continued)

*Primary Examiner* — Jose A Gonzalez Quinones
(74) *Attorney, Agent, or Firm* — Foley & Lardner LLP

(57) ABSTRACT

Disclosed is an electric driving device in which: two positive-electrode-side power lines (32, 33) are arranged from an outer peripheral side to an inner side of a mounting substrate (19); power conversion circuits (36, 37; 44, 45; 46, 47) are arranged on both sides of the mounting substrate, with respect to the positive-electrode-side power lines, to perform drive control of an electric motor; and output terminals (52, 53) are arranged on the mounting substrate at a location outward of the power conversion circuit so as to establish a connection to the electric motor. As the power conversion circuits are disposed from the center to the periphery of the mounting substrate, it is possible to decrease the wiring length and circuit mounting area of the mounting substrate (19) and suppress a radial size increase of the mounting substrate on which the redundant power conversion circuits are mounted.

21 Claims, 7 Drawing Sheets

(51) Int. Cl.
*H02K 5/04* (2006.01)
*B62D 5/04* (2006.01)

(58) Field of Classification Search
USPC .................................. 310/68 D, 71, 75 R, 98
See application file for complete search history.

(56) References Cited

U.S. PATENT DOCUMENTS

| | | | |
|---|---|---|---|
| 2008/0130223 A1 | 6/2008 | Nakamura et al. | |
| 2009/0115355 A1* | 5/2009 | Oyobe | H02M 7/487 |
| | | | 318/34 |
| 2010/0052449 A1* | 3/2010 | Hashimoto | B62D 5/0406 |
| | | | 310/91 |
| 2010/0079095 A1* | 4/2010 | Shibata | B62D 5/0487 |
| | | | 318/474 |
| 2012/0327609 A1* | 12/2012 | Kitamoto | H01L 23/36 |
| | | | 361/728 |
| 2013/0140930 A1* | 6/2013 | Koka | B60L 15/2009 |
| | | | 310/89 |
| 2013/0249335 A1* | 9/2013 | Motoda | H02K 11/0094 |
| | | | 310/71 |
| 2014/0062375 A1* | 3/2014 | Suzuki | H02P 21/22 |
| | | | 318/496 |
| 2015/0295503 A1* | 10/2015 | Muto | H02M 3/33561 |
| | | | 363/17 |
| 2015/0340966 A1 | 11/2015 | Mutsuura et al. | |
| 2016/0013706 A1 | 1/2016 | Mukunoki | |
| 2016/0311462 A1 | 10/2016 | Inada et al. | |
| 2016/0355210 A1 | 12/2016 | Inada et al. | |
| 2016/0362127 A1 | 12/2016 | Inada et al. | |

FOREIGN PATENT DOCUMENTS

| | | |
|---|---|---|
| JP | 2009-081993 A | 4/2009 |
| JP | 2013-060119 A | 4/2013 |
| JP | 2013-251991 A | 12/2013 |
| JP | 2015-116095 A | 6/2015 |
| WO | WO-2014/171023 A1 | 10/2014 |
| WO | WO-2015/087553 A1 | 6/2015 |
| WO | WO-2015/087554 A1 | 6/2015 |
| WO | WO-2015/087555 A1 | 6/2015 |

* cited by examiner

MR  MG  SH

ELECTRIC DRIVING DEVICE AND ELECTRIC POWER STEERING DEVICE

FIELD OF THE INVENTION

The present invention relates to an electric driving device and an electric power steering device, each of which has integrated therein an electronic control unit.

BACKGROUND ART

In the field of general industrial machinery, mechanical control elements are driven by electric motors. There has recently been started the use of a so-called mechanically and electrically integrated type electric driving device in which an electronic control unit with a semiconductor element and the like is integrally mounted on an electric motor to control a rotation speed and torque of the electric motor.

One example of the mechanically and electrically integrated type electric driving device is an electric power steering device for a vehicle, which is adapted to detect a rotational direction and torque of a steering shaft caused by driver's operation of a steering wheel and drive an electric motor based on the detection results such that the electric motor rotates in the same direction as the rotation of the steering shaft and thereby generates a steering assist torque. This power steering device is equipped with an electronic control unit (ECU) to control the electric motor.

Conventionally known is an electric power steering device of the type disclosed in Japanese Laid-Open Patent Publication No. 2013-60119 (Patent Document 1). The electric power steering device of Patent Document 1 includes an electric motor and an electronic control unit. The electric motor is installed in a cylindrical motor housing of aluminum alloy or the like. The electronic control unit is installed in an ECU housing that is disposed on a side of the motor housing axially opposite to an output shaft of the electric motor. The electronic control unit in the ECU housing has: a power supply circuit portion; a power conversion circuit portion provided with a power switching element such as MOSFET or IGBT to drive and control the electric motor; and a control circuit portion configured to control the power switching element. Output terminals of the power switching element are electrically connected to input terminals of the electric motor via a busbar.

To the electronic control unit in the ECU housing, electric power is supplied from a power source through a connector terminal assembly of synthetic resin. Further, an operation condition detection signal from a detection sensor or the like is inputted to the electronic control unit. The connector terminal assembly, which also serves as a lid member, is connected to the electronic control unit and is fixed to an outer surface of the ECU housing by fixing bolts so as to close an opening of the ECU housing.

As other examples of the electric driving device with the integrated electronic control unit, there are also known electric brakes and electric hydraulic systems for various hydraulic controls.

PRIOR ART DOCUMENTS

Patent Documents

Patent Document 1: Japanese Laid-Open Patent Publication No. 2013-60119

SUMMARY OF THE INVENTION

In an electric power steering device, an electric motor is used to assist steering operation; and a power conversion circuit is used as an inverter circuit to drive and control the electric motor. In the case where a single power conversion circuit is used as in the conventional power steering device, it becomes impossible to drive the electric motor in the event of a failure such as ground fault so that there arises a problem of deterioration in steering operability due to a decrease in assist force. It has recently been required that the electric power steering device be designed with redundancy by using two power conversion circuits of the same function to provide a backup in the event of a failure.

For such redundant system design, there is a need to additionally arrange the same power conversion circuit with the originally arranged power conversion circuit. It is conceivable to mount two power conversion circuits on separate mounting substrates. In this case, there arises a problem that the axial length of the ECU housing becomes long as the mounting substrates on which the power conversion circuits are mounted are stacked axially in the ECU housing.

In order to prevent the axial length of the ECU housing from becoming long, it is alternatively conceivable to mount two power conversion circuits on the same mounting substrate. In this case, the axial length of the ECU housing can be made shorter as compared with the case where two power conversion circuits are mounted on separate mounting substrates.

However, the radial length of the ECU housing becomes long in the case where two power conversion circuits are mounted on the same mounting substrate. There thus arises a new problem that the outside dimension of the ECU housing becomes large with increase in radial length. In addition, it is inevitably necessary that the mounting substrate has a shape installable in the ECU housing which is cylindrical in outside shape according the outside shape of the motor housing.

For the above reasons, how to densely mount two power conversion circuits on the same mounting substrate has been a significant issue. There has been a strong demand to develop a mounting technique capable of solving this issue.

The present invention has been made to propose a new mounting technique according to such a demand.

It is an object of the present invention to provide an electric driving device and an electric power steering device, each of which has a novel power conversion circuit portion with redundant power conversion circuits mounted on a mounting substrate so as to suppress a radial size increase of the mounting substrate. Herein, the term "power conversion circuit portion" refers to the combination of a mounting substrate and power conversion circuits mounted on the mounting substrate.

The basic features of the present invention are that: two positive-electrode-side power lines and two negative-electrode-side power lines are arranged adjacent to each other on a mounting substrate from an outer peripheral side to an inner side of the mounting substrate; power conversion circuits for drive control of an electric motor are arranged on both peripheral sides of the mounting substrate with respect to the two positive-electrode-side power lines and the two negative-electrode-side power lines; and output terminals for connection to the electric motor are arranged on the mounting substrate at a location outward of the power conversion circuits.

As the power conversion circuits are arranged from the center to the periphery of the mounting substrate in the present invention, it is possible to attain a shorter wiring length and smaller mounting area for the power conversion circuits and thereby possible to suppress a radial size increase of the mounting substrate on which the redundant power conversion circuits are mounted.

DESCRIPTION OF EMBODIMENTS

Hereinafter, embodiments of the present invention will be described below with reference to the drawings. It should be understood that: the present invention is not limited to the following embodiments; and various modifications and application examples are possible within the technical scope of the present invention.

Before addressing details of the respective embodiments of the present invention, a brief explanation will be given of the configuration of a steering apparatus to which the present invention is applicable and the configuration of an electric power steering device as an example of a mechanically and electronically integrated type electric driving device with reference to FIGS. 1, 2 and 3.

Figure 1:
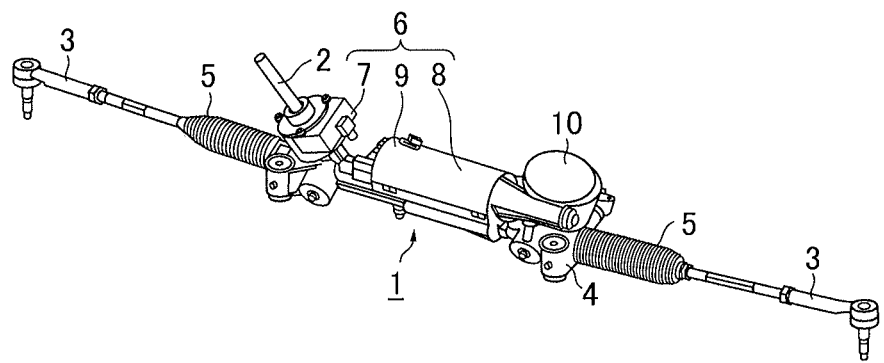
FIG. 1 is an overall perspective view of a steering apparatus as an application example of the present invention.

The steering apparatus is herein configured to steer front wheels of a vehicle as shown in FIG. 1. A steering shaft 2 is connected at an upper end thereof to a steering wheel (not shown). A pinion (not shown) is mounted on a lower end of the steering shaft 2 and brought into engagement with a rack (not shown) that is long in a lateral direction of the vehicle body. Tie rods 3 are coupled to both ends of the rack so as to turn the front wheels left or right. The rack is covered by a rack housing 4. Rubber booths 5 are provided between the rack housing 4 and the tie rods 3.

The electric power steering device 6 is arranged to generate a torque for assisting in steering operation of the steering wheel. The electric power steering device 6 includes: a torque sensor 7 that detects a rotational direction and torque of the steering shaft 2; an electric motor unit 8 that applies a steering assist force to the rack through a gear 10 based on the detection results of the torque sensor; and an electronic control unit (ECU) 9 that performs motor drive control of the electric motor unit 8. In the electric power steering device 6, an output shaft side of the electric motor unit 8 is coupled at three peripheral points thereof to the gear 10 by bolts (not shown). The electronic control unit 9 is located on a side of the electric motor unit 8 opposite to the output shaft side.

Figure 2:
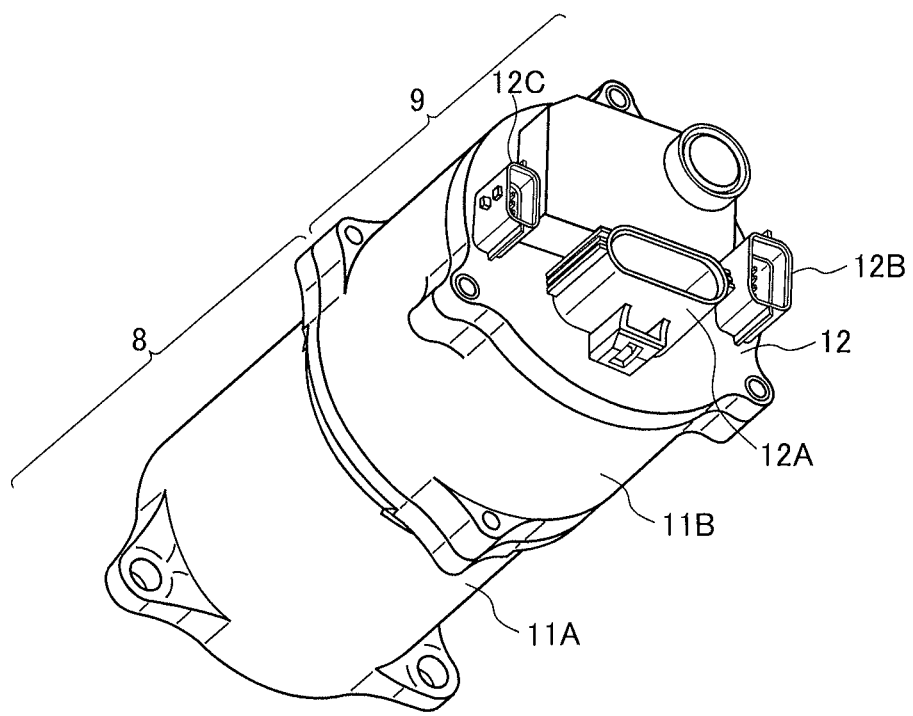
FIG. 2 is an overall perspective view of an electric power steering device as an example of a mechanically and electrically integrated type electric driving device.

As shown in FIG. 2, the electric motor unit 8 has: a motor housing 11A formed of aluminum alloy or the like with a cylindrical portion; and an electric motor (such as three-phase direct-current electric motor; not specifically shown) installed in the motor housing 11A. The electronic control unit 9 has: an ECU housing 11B formed of aluminum alloy or the like and disposed on a side of the motor housing 11A axially opposite to an output shaft of the electric motor: and an electronic control assembly (not shown) installed in the ECU housing 11B.

The motor housing 11A and the ECU housing 11B are integrally fixed at opposed end faces thereof to each other by fixing bolts. The electronic control assembly in the ECU housing 11B includes: a power supply circuit portion configured to supply electric power as required; a power conversion circuit portion provided with power switching elements such as MOSFETs or IGBTs and configured to drive and control the electric motor of the electric motor unit 8; and a control circuit portion configured to control the power switching elements. Output terminals of the power switching elements are electrically connected to input terminals of the electric motor via a busbar.

A lid member 12, which is made of synthetic resin, is fixed to an end face of the ECU housing 11B by fixing bolts. The lid member 12 also serves as a connector terminal assembly and has: a connector terminal portion 12A for connection to a power source; a connector terminal portion 12B for connection to a detection sensor; and a connector terminal portion 12C for output of control status information to an external device. The electronic control assembly in the ECU housing 11B is supplied with electric power from the power source through the power source connection terminal portion 12A of the resinous lid member 12. An operation status detection signal from the detection sensor is inputted to the electronic control assembly through the detection sensor connection terminal portion 12B. A current control status information signal of the electric power steering device is outputted to the external device through the control status information output connection terminal 12C. In this example, the lid member 12 is shaped to cover the entire opening end of the ECU housing 11B. The lid member 12 may alternatively be formed with smaller connector terminal portions so as to establish connection to the electric control assembly by insertion through an insertion hole of the ECU housing 11B.

The above-configured electric power steering device 6 operates as follows. When the steering shaft 2 is rotated in either direction with operation of the steering wheel, the rotational direction and torque of the steering shaft 2 are detected by the torque sensor 7. Based on these detection results, a driving operation amount of the electric motor is determined by the control circuit portion. The electric motor is driven by the power switching elements of the power conversion circuit portion according to the determined driving operation amount. Then, the output shaft of the electric motor rotates in the same direction as the operation direction of the steering shaft 1. The rotation of the output shaft is transmitted from the pinion to the rack through the gear 10 for steering of the vehicle. As the configurations and operations of these mechanisms are well known, a further detailed explanation will be omitted.

The power steering device is not limited to the above-mentioned so-called pinion assist type, and can alternatively be of the so-called column assist type where the electric motor unit 8 and the electronic control unit 9 are mounted together with a reducer on a column, in which the steering shaft 2 connected to the steering wheel is rotatably held, so as to apply an assist force to the column.

Figure 3:
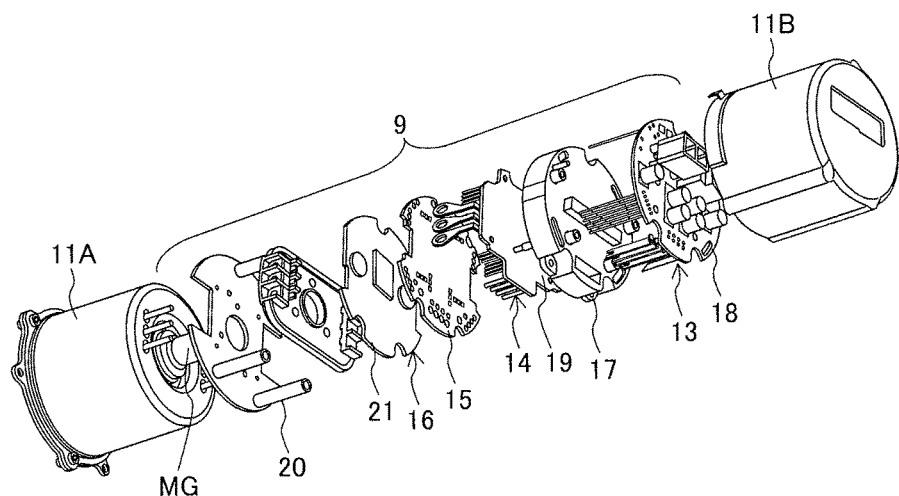
FIG. 3 is an exploded perspective view of the electric power steering device of FIG. 2.

The electric power electric device 6 is shown in exploded perspective view in FIG. 3. Generally, the electric motor is installed in the motor housing 11A. Although the motor housing 11A and the ECU housing 11B are formed as separate pieces of aluminum alloy, these housings may be integrally formed in a single piece.

In the electronic control unit 9, the ECU housing 11B is coupled to the side of the motor housing 11A opposite to the output shaft of the electric motor, which is installed in the motor housing; and the lid member is fixed by the plurality of fixing bolts to the ECU housing 11B. The lid member also serves as the connector terminal assembly as mentioned above and can be formed by injection molding of synthetic resin. Various connector wirings are embedded in the lid member by insert molding.

The power supply circuit portion 13 is installed in an installation space defined by the ECU housing 11B and the lid member. The power conversion circuit portion 14 is installed, together with a guide mold plate 15 and the control circuit portion 16, in an installation space inside the ECU housing 11B. The electronic control assembly is constituted by the power supply circuit portion 13, the power conversion circuit portion 14, the guide mold plate 15 and the control circuit portion 16.

A heat radiation substrate 17, which is made of metal such as aluminum or aluminum alloy, is disposed inside the ECU housing 11B and integrally coupled to the ECU housing 11B. First and second mounting substrates 18 and 19, each of which is made of metal, are fixed to both sides of the heat radiation substrate 17. Electronic components as constituents of the power supply circuit portion 13 and the power conversion circuit portion 14 are respectively mounted on one side of the first mounting substrate 18 and on one side of the second mounting substrate 19.

As mentioned above, the heat radiation substrate 17 formed of aluminum, aluminum alloy or the like with a predetermined thickness is placed between the first and second mounting substrates 18 and 19 each formed of metal. Further, the heat radiation substrate 17 is integrally coupled to the ECU housing 11B. The heat radiation substrate thus functions as a heat radiator to radiate heat from the ECU housing 11B to the outside. A heat radiating material of high thermal conductivity, such as heat radiating adhesive, heat radiating sheet or heat radiating grease, is interposed between the mounting substrate 18, 19 and the heat radiation substrate 17 for increase in thermal contact.

The power supply circuit portion 13 is situated between the lid member and the heat radiation substrate 17. The main function of the power supply circuit portion 13 is to generate and supply direct-current power to an inverter for driving the electric motor.

The power supply circuit portion 13 has a structure in which electronic components, including a capacitor, a coil, a power switching element such as MOSFET, a power source side connector for connection with a power source side connector terminal from the battery power source, a high-voltage-side connector for connection with a high-voltage-side connector terminal to supply high voltage power to the power conversion circuit portion 14, and a low-voltage-side connector for connection with a low-voltage-side connector terminal to supply low voltage power to the control circuit portion 16, are mounted on one surface of the mounting substrate 18 of high thermal conductivity metal such as aluminum. After an insulating layer is formed on the first mounting substrate 18 of aluminum, a wiring pattern of copper foil is printed on the insulating layer. The electronic components are mounted on the wiring pattern and electronically connected to one another via the wiring pattern. In the power supply circuit portion 13, there are used relatively large-size (tall) electronic components such as condenser, coil and connectors. In the case where the power consumption is low, the first mounting substrate 18 may be made of resin.

The power conversion circuit portion 14 is situated on the side of the heat radiation substrate 17 opposite to the power supply circuit portion 13. The main function of the power conversion circuit portion 14 is to execute inverter control for driving the electric motor. The power conversion circuit portion 14 is located such that the second mounting substrate 19 of the power conversion circuit portion 14 is opposed to and faces the first mounting substrate 18 of the power supply circuit portion 13 through the heat radiation substrate 17.

The opposed surfaces of the second mounting substrate 19 and the first mounting substrate 18 are adapted to allow easy heat transfer from and to the heat radiation substrate 17. Further, the heat radiating material of high thermal conductivity, such as heat radiating adhesive, heat radiating sheet or heat radiating grease, is interposed between the mounting substrate 18, 19 and the heat radiation substrate 17 as mentioned above.

The power conversion circuit portion 14 has a structure in which electronic components, including a plurality of power switching elements such as MOSFETs or IGBTs, output terminals for output from the power switching elements, and connector terminals for input of source, drain gate input signals to the power switching elements as well as for feedback of the operation status of the power switching elements to the control circuit portion 16, are mounted on one surface of the mounting substrate 19 of high thermal conductivity metal such as aluminum. The power conversion circuit portion 14 also has an inverter side connector for receipt of power supply from the power supply circuit portion 13. Herein, the power conversion circuit portion 14 consists of: the mounting substrate 19; and power conversion circuits mounted on the mounting substrate 19.

The control circuit portion 16 is situated between the power conversion circuit portion 14 and the motor housing 11A. The main function of the control circuit portion 16 is to execute switching control of the switching elements of the power conversion circuit portion 14. Resin substrate mounting bosses 20 are formed in the ECU housing 11B so as to extend toward the motor housing 11A. A resin substrate 21 of the control circuit portion 16 is fixed by mounting bolts to the resin substrate mounting bosses 20.

The control circuit portion 16 has a structure in which a microcomputer for control of the power switching elements of the power conversion circuit portion 14 are disposed on the resin substrate 21 of synthetic resin. As shown in FIG. 3, electronic components including not only the microcomputer 32 but also its peripheral circuits are mounted on the resin substrate 21. There is also mounted a magnetism detection element (such as MR element) such that the magnetism detection element operates in synchronism with a sensor magnet MG, which is fixed to the rotation shaft of the electric motor, so as to detect a rotation speed and phase of the electric motor.

As mentioned above, the power supply circuit portion 13, the heat radiation substrate 17, the power conversion circuit portion 14 and the control circuit portion 18 are arranged in this order from the lid member toward the motor housing 11A. As the control circuit portion 16 is located at a distance away from the power supply circuit portion 13, the electric power can be stably supplied to the control circuit portion 16 after the removal of power source noise.

By the way, it has recently been required that the electric power steering device be designed with redundancy by using two power conversion circuits of the same function to provide a backup in the event of a failure as already mentioned above. For such redundant system design, there is a need to additionally arrange the same power conversion circuit with the originally arranged power conversion circuit. It is conceivable to mount two power conversion circuits on the same mounting substrate. In this case, the axial length of the ECU housing can be made shorter as compared with the case where two power conversion circuits are mounted on separate mounting substrates.

However, the radial length of the ECU housing becomes long in the case where two power conversion circuits are mounted on the same mounting substrate. There thus arises a new problem that the outside dimension of the ECU housing becomes large with increase in radial length. In addition, it is inevitably necessary that the mounting substrate has a shape installable in the ECU housing which is cylindrical in outside shape according the outside shape of the motor housing.

For the above reasons, how to densely mount two power conversion circuits on the same mounting substrate has been a significant issue. There has been a strong demand to develop a mounting technique capable of solving this issue.

Embodiment 1

In order to meet such a demand, the first embodiment of the present invention proposes the following mounting technique.

The power conversion circuit portion according to the first embodiment is so structured that: two positive-electrode-side power lines are arranged in the vicinity of the center of the mounting substrate from an outer peripheral side to an inner side of the mounting substrate; negative-electrode-side power lines and power conversion circuits for drive control of the electric motor are arranged on both sides of the mounting substrate with respect to the positive-electrode-side power lines; and output terminals for connection to the electric motor are arranged on the mounting substrate at a location outward of the power conversion circuits.

In the first embodiment, the power conversion circuits are arranged from the center to the periphery of the mounting substrate. This arrangement leads to a shorter wiring length and smaller mounting area for the power conversion circuits. It is therefore possible to suppress a radial size increase of the mounting substrate on which the redundant power conversion circuits are mounted.

The first embodiment of the present invention will be described in more detail below with reference to the drawings.

In the first embodiment, the electric motor M used is in the form of a three-phase direct-current electric motor having U-, V- and W-phase coils wound on a stator core; and the power conversion circuit portion 14 is configured to supply regulated power to these respective phase coils. As MOSFETs are used as the power switching elements, the power switching elements are hereinafter representatively referred to as MOSFETs in the following description.

Figure 4:
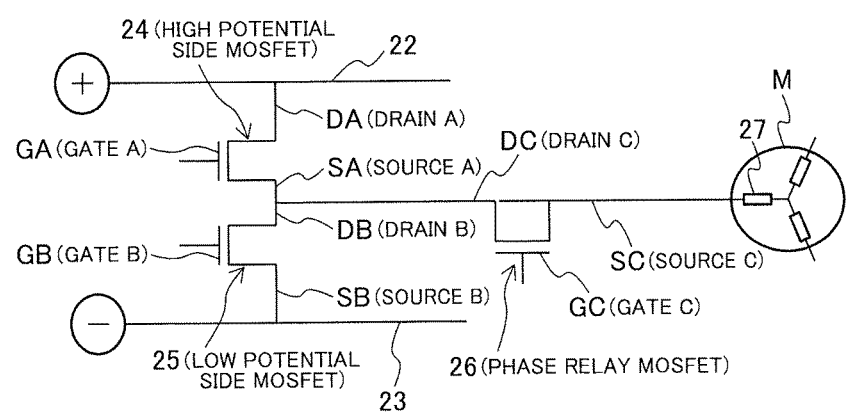
FIG. 4 is a circuit diagram of a power conversion circuit for one phase.

The power conversion circuit of the power conversion circuit portion 14 is generally configured as an inverter circuit as shown in FIG. 4.

More specifically, the circuit diagram for one phase is shown in FIG. 4. The high-potential-side MOSFET 24 and the low-potential-side MOSFET 25 are connected in series to each other between the positive-electrode-side (power-source-side) power line 22 and the negative-electrode-side (ground-side) power line 23. The phase relay MOSFET 26 is connected the corresponding phase coil 27 of the electric motor M.

The high-potential-side MOSFET 24 has a drain DA, a gate GA and a source SA. The drain DA is connected to the positive-electrode-side power line 22. The low-potential-side MOSFET 25 has a drain DB, a gate GB and a source SB. The source SB is connected to the negative-electrode-side power line 23. The source SA of the high-potential-side MOSFET 24 is connected to the drain DB of the low-potential-side MOSFET 25.

The phase relay MOSFET 26 has a drain DC, a gate GC and a source SC. The drain DC is connected to the connection point between the source SA of the high-potential-side MOSFET 24 and the drain DB of the low-potential-side MOSFET 25. The source SC is connected to the coil 27.

The regulated power is hence supplied to the coil 27 of the electric motor by the output of control signals from the control circuit portion 16 to the respective gates GA, GB and GB of the high-potential-side MOSFET 24, the low-potential-side MOSFET 26 and the phase relay MOSFET 26.

Although the circuit diagram for one phase is shown in FIG. 4, the circuit diagrams for the other two phases are similar to that shown between the positive-electrode-side power line 22 and the negative-electrode-side power line 23 in the figure so that there is established a three-phase bridge circuit configuration. The plurality of power conversion circuits (corresponding in number to the winding systems of the electric motor M), each of which has such a circuit configuration, are mounted on the second mounting substrate 19.

Figure 5:
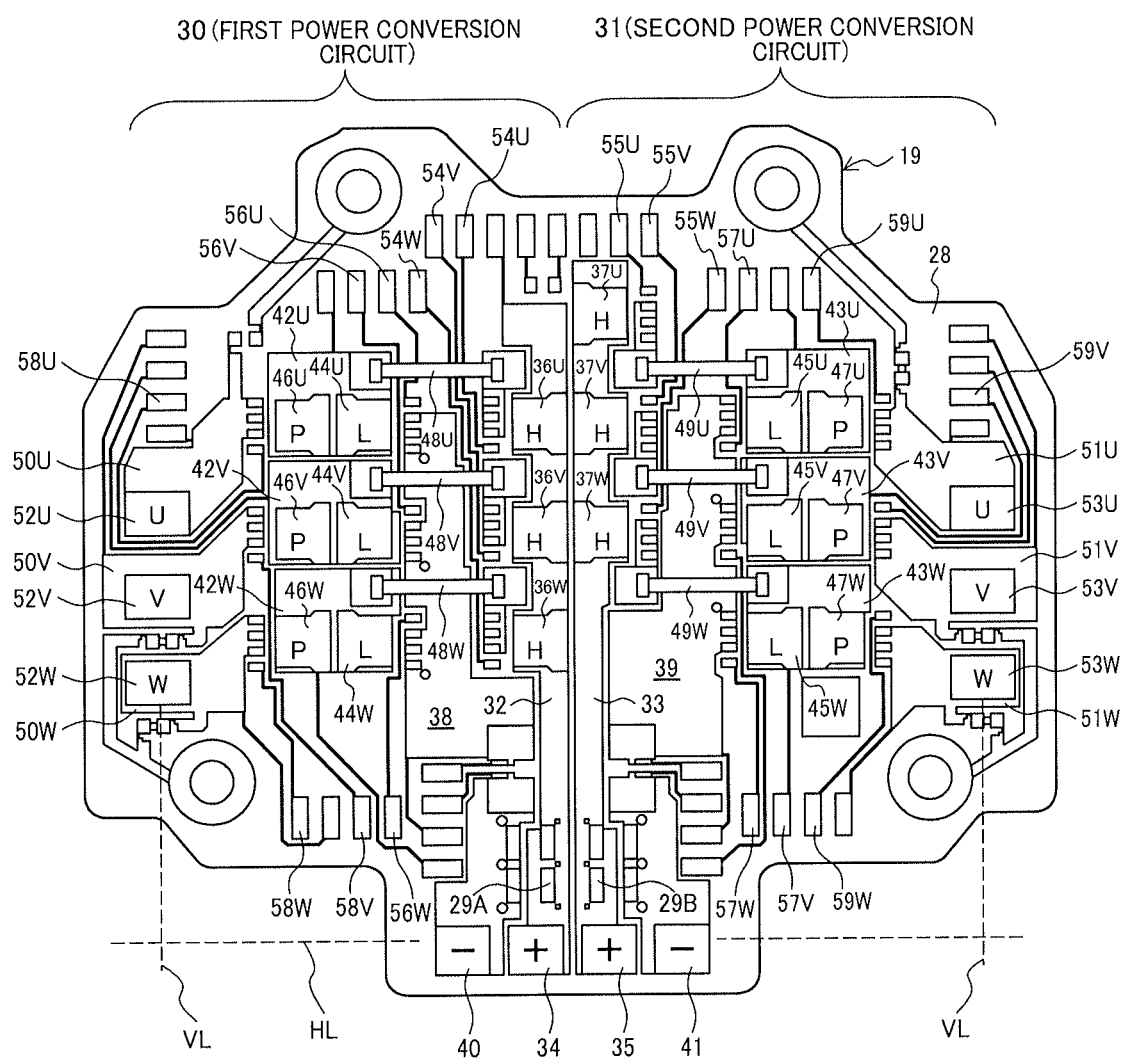
FIG. 5 is a top view of a power conversion circuit portion in which redundant power conversion circuits are mounted on a mounting substrate according to a first embodiment of the present invention.

The mounted state of the electronic components in the power conversion circuit portion 14 according to the first embodiment will be now explained below with reference to FIG. 5. In FIG. 5, each high-potential-side MOSFET is designated by "H" as an abbreviation of High; each low-potential-side MOSFET is designated by "L" as an abbreviation of Low; and each phase relay MOSFET is designated by "P" as an abbreviation of Phase.

In FIG. 5, the second mounting substrate 19 of the power conversion circuit portion 14 is made of metal high in thermal conductivity, such as aluminum, as mentioned above. After an insulating layer is formed on the second mounting substrate 19, wiring lines (wiring pattern) of copper foil are printed on the insulating layer. On these wiring lines, there are disposed the plurality of MOSFETs, the output terminals for output from the respective MOSFETs, the input terminals for input of the gate, drain and source input signals to the respective MOSFETs, and the monitor terminals for feedback of the operation status of the respective MOSFETs to the control circuit portion 16.

An insulating region 28 is present on substantially the whole main surface of the second mounting substrate 19. The first power conversion circuit 30 and the second power conversion circuit 31 are arranged on both sides (left and right sides in FIG. 5) of the insulating surface region of the second mounting substrate 19 with respect to the vicinity of the center C of the second mounting substrate 19. In the first embodiment, the first and second power conversion circuits 30 and 31 are substantially the same in configuration but are different from each other in the arrangement positions of the high-potential-side MOSFETs. These arrangements will be explained later in detail.

Herein, the motor winding as designated by reference numeral 27 in FIG. 4 is provided as two systems in the motor housing. The first winding is energized by the first power conversion circuit 30. The second winding is energized by the second power conversion circuit 31.

The electric motor M is consequently driven by about 50% outputs of the respective drive systems relative to the required assist torque when the power steering device 6 is in a normal operating state.

In the event of an abnormal condition such as element failure, motor circuit ground fault or short-circuit in the first power conversion circuit 30, the control circuit portion 16 stops the operation of the first power conversion circuit 30. The second power conversion circuit 31 continues its operation to continuously supply power to the electric motor. Thus, the current supplied to the electric motor during this abnormal condition is about half of the maximum current supplied during the normal operation condition.

In the event of an abnormal condition in the second power conversion circuit 31, the reverse operations are performed.

It is alternatively feasible to, in a normal operating state, control the electric motor by the first power conversion circuit 30 while interrupting the input/output of the second power conversion circuit 31. In this case, the electric motor M is driven by output of the first power conversion circuit corresponding to the required assist torque (e.g. 100% output relative to the assist torque).

In the event of an abnormal condition such as ground fault in the first power conversion circuit 30, the control circuit portion 16 stops the operation of the first power conversion circuit 30. Instead, the control circuit portion starts the operation of the second power conversion circuit 30 as a backup to supply power to the electric motor.

As shown in FIG. 5, the wiring pattern for connection to the drains, sources and gates of the respective MOSFETs is printed on the insulating surface region 28 of the second mounting substrate 19. In the vicinity of the center C of the second mounting substrate 19, the first positive-electrode-side power line 32 for the first power conversion circuit 30 and the second positive-electrode-side power line 33 for the second power conversion circuit 31 are insulatedly arranged adjacent to each other at a predetermined interval so as to lie vertically across the second mounting substrate 19 in FIG. 5.

Each of the first and second positive-electrode-side power lines 32 and 33 has a predetermined width and extends substantially linearly through the vicinity of the center C of the second mounting substrate 19. These positive-electrode-side power lines 32 and 33 are connected to their corresponding first and second positive-electrode-side power terminals 34 and 35. The first and second positive-electrode-side power terminals 34 and 35 are connected to the positive electrode of the power supply circuit portion.

In other words, the first and second positive-electrode-side power lines 32 and 33 are insulatedly disposed adjacent to each other so as to extend across the substrate toward the center C from the first and second positive-electrode-side power terminals 34 and 35, which are insulatedly disposed adjacent to each other along the periphery (edge side) of the second mounting substrate 19.

The after-mentioned first and second negative-electrode-side power lines 38 and 39 are arranged adjacent to and outward of the first and second positive-electrode-side power terminals 34 and 35, so as to lie along outer sides of the first and second positive-electrode-side power lines 32 and 33.

Each of the first and second positive-electrode-side power terminals 34 and 35 is formed as a connection land.

The high-potential-side MOSFETs 36U, 36V and 36W for the respective phases are disposed on the common power line, that is, the first positive-electrode-side power line 32. The high-potential-side MOSFET (first U-phase) 36U, the high-potential-side MOSFET (first V-phase) 36V and the high-potential-side MOSFET (first W-phase) 36W are arranged in this order from the outer peripheral side (the upper side in FIG. 5) opposite to the outer peripheral side on which the first positive-electrode-side power terminal 34 is disposed.

The high-potential-side MOSFETs 37U, 37V and 37W for the respective phases are disposed on the common power line, that is, the second positive-electrode-side power line 33. The high-potential-side MOSFET (second U-phase) 37U, the high-potential-side MOSFET (second V-phase) 37V and the high-potential-side MOSFET (second W-phase) 37W are arranged in this order from the upper side in FIG. 5. The arrangement order of the MOFETs for these three phases is arbitrary. The arrangement positions of the MOS-FETs are set as appropriate depending on the positions of the output terminals of the electric driving device.

The first and second positive-electrode-side power lines 32 and 33 each function as a common connection part of the drains DA of the respective phase high-potential-side MOS-FETs as shown in FIG. 4.

The first and second negative-electrode-side power lines 38 and 39 are arranged on both peripheral sides (outer sides) of the mounting substrate 19 with respect to the positive-electrode-side power lines 32 and 33. The first and second negative-electrode-side power lines 38 and 39 have a predetermined width and extend substantially linearly along and adjacent to the positive-electrode-side power lines 32 and 33 on the mounting substrate 19. The negative-electrode-side power lines 38 and 39 are connected to their corresponding first and second negative-electrode-side power terminals 40 and 41. The first and second negative-electrode-side power terminals 40 and 41 are connected to the negative electrode of the power supply circuit portion. The negative-electrode-side power lines 38 and 39 each function as a common connection part of the sources SB of the respective phase low-potential-side MOSFETs.

Shunt resistors 29A and 29B are formed at symmetric positions between the first and second negative-electrode-side power lines 38 and 39 and the first and second negative-electrode-side power terminals 40 and 41.

The positive-electrode-side power terminals 34 and 35 and the negative-electrode-side power terminals 40 and 41 are respectively adjacent to each other and are aligned in a line.

As mentioned above, the positive-electrode-side power lines 32 and 33 and the negative-electrode-side power lines 38 and 39 are arranged adjacent to each other. It is thus possible to shorten the wiring length and decrease the mounting area. As the positive-electrode-side power lines 32 and 33 and the negative-electrode-side power lines 38 and 39 are arranged adjacent to each other, it is possible to reduce inductance and noise by shortening of the wiring length. Furthermore, the positive-electrode-side power terminals 34 and 35 and the negative-electrode-side power terminals 40 and 41 of the first and second power conversion circuits 30 and 31 are arranged adjacent to each other. As the power terminals for connection to the power supply circuit portion 13 are brought together into one location, it is possible to integrate the area for connection of the mounting substrate 16 and simplify the structure for connection of the mounting substrate.

First connection wiring sections 42U to 42W and second connection wiring sections 43U to 43W are arranged on more outer peripheral sides of the mounting substrate 19 than the negative-electrode-side power lines 38 and 39 (i.e. outer sides opposite to the positive-electrode-side power lines 32 and 33). The first, second connection wiring sections 42U to 42W, 43U to 43W are formed as three divided sections corresponding to the respective phases and are insulated from one another. The low-potential-side MOSFET and the phase relay MOSFET for each phase are disposed on the corresponding wiring section.

The arrangement order of the first connection wiring sections 42U, 42V and 42W (the second connection wiring sections 43U, 43V and 43W) corresponds to the arrangement order of the high-potential-side MOSFETs 36U (37U), 36V (37V) and 36W (37W) relative to the wiring direction of the first positive-electrode-side power line 32 (the second positive-electrode-side power line 33).

The low-potential-side MOSFETs for the respective phases are insulatedly disposed on the first connection wiring sections 42U to 42W. The low-potential-side MOSFET (first U-phase) 44U, the low-potential-side MOSFET (first V-phase) 44V and the low-potential-side MOSFET (first W-phase) 44W are arranged in this order from the upper side in FIG. 5.

Similarly, the low-potential-side MOSFETs for the respective phases are insulatedly disposed in on the second connection wiring sections 43U to 43W. The low-potential-side MOSFET (second U-phase) 45U, the low-potential-side MOSFET (second V-phase) 45V and the low-potential-side MOSFET (second W-phase) 45W are arranged in this order from the upper side in FIG. 5.

The phase relay MOSFETs for the respective phases are also insulatedly disposed, together with the corresponding low-potential-side MOSFETs, on the first connection wiring sections 42U to 42W. The phase relay MOSFET (first U-phase) 46U, the phase relay MOSFET (first V-phase) 46V and the phase relay MOSFET (first W-phase) 46W are arranged in this order from the upper side in FIG. 5 on the respective first connection wiring sections 42.

Similarly, the phase relay MOSFETs for the respective phases are disposed on the second connection wiring sections 43U to 43W. The phase relay MOSFET (second U-phase) 47U, the phase relay MOSFET (second V-phase) 47V and the phase relay MOSFET (second W-phase) 47W are arranged in this order from the upper side in FIG. 5. The first connection wiring sections 42U to 42W and the second connection wiring sections 43U to 43W function as connection parts of the sources SA, the drains DB and the drains DC as shown in FIG. 4.

As shown in FIG. 5, each set of the high-potential-side MOSFETs, the low-potential-side MOSFETs and the phase relay MOSFETs are preferably aligned along the wiring direction of the positive-electrode-side power lines 32 and 33. This allows easy wiring and contributes to a size reduction of the mounting substrate 19.

It is more preferable that the three respective phase MOSFETs are aligned in substantially the same line in parallel with the positive-electrode-side power line 32, 33 for more ease of wiring and for contribution to a size reduction of the mounting substrate 19.

As the negative-electrode-side power line 38, 39 is located between the positive-electrode-side power line 32, 33 on which the high-potential-side MOSFETs are disposed and the connection wiring sections 42U to 42W, 43U to 43W on which the low-potential-side MOSFETs are disposed, it is necessary to establish connections between the high-potential-side MOSFETs and the low-potential-side MOSFETs over the negative electrode side power line 38, 39.

For this reason, a jumper wire 48U is provided between the high-potential-side MOSFET (first U-phase) 36U and the low-potential-side MOSFET (first U-phase) 44U; a jumper wire 48V is provided between the high-potential-side MOSFET (first V-phase) 36V and the low-potential-side MOSFET (first V-phase) 44V; and a jumper wire 48W is provided between the high-potential-side MOSFET (first W-phase) 36W and the low-potential-side MOSFET (first W-phase) 44W.

Similarly, a jumper wire 49U is provided between the high-potential-side MOSFET (second U-phase) 37U and the low-potential-side MOSFET (second U-phase) 45U; a jumper wire 49V is provided between the high-potential-side MOSFET (second V-phase) 37V and the low-potential-side MOSFET (second V-phase) 45V; and a jumper wire 49W is provided between the high-potential-side MOSFET (second W-phase) 37W and the low-potential-side MOSFET (second W-phase) 45W.

The high-potential-side MOSFETs 36U to 36W and the low-potential-side MOSFETs 44U to 44W of the first power conversion circuit 30 are respectively opposed to each other on the same lines. The jumper wires 48U to 48W are connected to the upper sides of the respective MOSFETs in FIG. 5 for mutual connection between the MOSFETs.

By contrast, the high-potential-side MOSFETs 37U to 37W of the second power conversion circuit 31 are shifted by one MOSFET toward the upper side (i.e. the outer peripheral side opposite to the outer peripheral side on which the second positive- and negative-electrode-side power terminals 35 and 41 are disposed) relative to the high-potential-side MOSFETs 36U to 36W of the second power conversion circuit 30. Further, the low-potential-side MOSFETs 45U to 45W are shifted by one MOSFET toward the lower side (i.e. the outer peripheral side on which the second positive- and negative-electrode-side power terminals 35 and 41 are disposed) relative to the high-potential-side MOSFETs 37U to 37W.

Differently from the high-potential-side MOSFETs 36U to 33W of the first power conversion circuit 30, the jumper wires 49U to 49W are connected to the lower sides of the high-potential-side MOSFETs 37U to 37W in FIG. 5. The jumper wires 48U to 48W and 49U to 49W are hence located symmetrically so as to correspond in position to each other.

On the mounting substrate 19, first output wiring sections 50U to 50W and second output wiring sections 51U to 51W are arranged on more outer peripheral sides of the mounting substrate 19 than the first connection wiring sections 42 to 42W and the second connection wiring sections 43U to 43W (i.e. outer sides opposite to the positive-electrode-side power lines 32 and 33). The first, second output wiring sections 50U to 50W, 51U to 51W are formed as three divided sections corresponding to the respective phases and are insulated from one another. The output terminal for each phase is disposed on the corresponding output wiring section.

The output terminals for the respective phases are insulatedly formed as connection lands on the first output wiring sections 50U to 50W. The first U-phase output terminal 52U, the first V-phase output terminal 52V and the first W-phase output terminal 52W are arranged in this order from the upper side in FIG. 5. The output terminals for the respective phases are also insulatedly formed on the second output wiring sections 51U to 51W. The second U-phase output terminal 53U, the second V-phase output terminal 53V and the second W-phase output terminal 53W are arranged in this order from the upper side in FIG. 5 (i.e. the outer peripheral side opposite to the outer peripheral side on which the second positive- and negative-electrode-side power terminals 35 and 41 are disposed).

Accordingly, the first power conversion circuit 30 is structured as follows: the high-potential-side MOSFET (first U-phase) 36U, the high-potential-side MOSFET (first V-phase) 36V and the high-potential-side MOSFET (first W-phase) 36W are located on the first positive-electrode-side power line 32; the low-potential-side MOSFET (first U-phase) 44U, the low-potential-side MOSFET (first V-phase) 44V and the low-potential-side MOSFET (first W-phase) 36W are located closer to the outer periphery of the mounting substrate than (=located outward of) the high-potential-side MOSFETs in parallel with the first positive-electrode-side power line 32; the phase relay MOSFET (first U-phase) 46U, the phase relay MOSFET (first V-phase) 46V and the phase relay MOSFET (first W-phase) 46W are located closer to the outer periphery of the mounting substrate than (=located outward of) the low-potential-side MOSFETs in parallel with the first positive-electrode-side power line 32; and the first U-phase output terminal 52U, the first V-phase output terminal 52V and the first W-phase output terminal 52W are located closer to the outer periphery of the mounting substrate than (=located outward of) the phase relay MOSFETs in parallel with the first positive-electrode-side power line 32.

The second power conversion circuit 31 is also structured as follows: the high-potential-side MOSFET (second U-phase) 37U, the high-potential-side MOSFET (second V-phase) 37V and the high-potential-side MOSFET (second W-phase) 37W are located on the second positive-electrode-side power line 33; the low-potential-side MOSFET (second U-phase) 45U, the low-potential-side MOSFET (second V-phase) 45V and the low-potential-side MOSFET (second W-phase) 45W are located closer to the outer periphery of the mounting substrate than (=located outward of) the high-potential-side MOSFETs in parallel with the second positive-electrode-side power line 33; the phase relay MOSFET (second U-phase) 47U, the phase relay MOSFET (second V-phase) 47V and the phase relay MOSFET (second W-phase) 47W are located closer to the outer periphery of the mounting substrate than (=located outward of) the low-potential-side MOSFETs in parallel with the second positive-electrode-side power line 33; and the second U-phase output terminal 53U, the second V-phase output terminal 53V and the second W-phase output terminal 53W are located closer to the outer periphery of the mounting substrate than (=located outward of) the phase relay MOSFETs in parallel with the second positive-electrode-side power line 33.

In this way, the first power conversion circuit 30 and the second power conversion circuit 31 are formed substantially symmetrically with respect to the first and second positive-electrode-side power lines 32 and 33 in the vicinity of the center of the mounting substrate 19 in the first embodiment. As the high-potential-side MOSFET, the low-potential-side MOSFET and the phase relay MOSFET for each phase are arranged in this order toward the peripheral side (outer side) along a direction perpendicular to the wiring direction of the positive-electrode-side power line (i.e. the vertical direction of FIG. 5), it is possible to shorten the wiring line and decrease the mounting area. It is also possible to reduce inductance and noise as the positive-electrode-side power lines 32 and 33 and the negative-electrode-side power lines 38 and 29 are arranged adjacent to each other.

Referring back to FIG. 5, the output terminals 52U, 52V and 52W of the first power conversion circuit 30 and the output terminals 53U, 53V and 53W of the second power conversion circuit 31 are respectively aligned in the same vertical lines parallel with each other as shown by broken lines VL; and the positive-electrode-side power terminals 34 and 35 and the negative-electrode-side power terminals 40 and 41 of the first and second power conversion circuits 30 and 31 are aligned in the same horizontal line as shown by broken line HL.

The arrangement directions (broken lines VL) of the output terminals 52U, 52V and 52W of the first power conversion circuit 30 and the output terminals 53U, 53V and 53W of the second power conversion circuit 31 are perpendicular to the arrangement direction (broken line HL) of the positive-electrode-side power terminals 34 and 35 and the negative-electrode-side power terminals 40 and 41 of the first and second power conversion circuits 30 and 31 as shown in FIG. 5.

It is possible by such arrangement that, even though the mounting substrate 19 is formed into an outside shape according to the cylindrical shape of the ECU housing 11B, the output terminals 52U, 52V, 52W, 53U, 53V and 53W and the power terminals 34, 35, 40 and 41 of the first and second power conversion circuits 30 and 31 can be arranged according to such a cylindrical shape. This contributes to a size reduction of the second mounting substrate 19.

Furthermore, the high-potential-side MOSFETs 36U, 36V and 36W of the first power conversion circuit 30 and the high-potential-side MOSFETs 37U, 37V and 37W of the second power conversion circuit 31 are shifted by one MOSFET size as shown in FIG. 5. In other words, the outermost MOSFET of one of the power conversion circuits is located on the upper or lower side in the figure relative to that of the other power conversion circuit. It is thus possible to make effective use of the mounting surface of the mounting substrate 19 which is shaped according to the cylindrical ECU housing 11B.

For example, in the case where the high-potential-side MOSFETs 36U, 36V and 36W and the high-potential-side MOSFETs 37U, 37V and 37W are brought together in a butting manner in the vicinity of the center of the mounting substrate 19, the peripheral side MOSFETs are located close to the peripheral edge of the mounting substrate 19. The sufficient mounting area cannot be obtained for such peripheral side part. It is necessary to enlarge the mounting substrate in order to ensure the mounting area for the peripheral side part.

In the case where the high-potential-side MOSFETs 36U, 36V and 36W and the high-potential-side MOSFETs 37U, 37V and 37W are arranged as shown in FIG. 5 in the first embodiment, by contrast, only one MOSFET is located close to the peripheral edge of the mounting substrate 19. It is thus possible to obtain the sufficient mounting area for the peripheral side part.

In the case where the second mounting substrate 19 is made more circular corresponding to the curved surface of the motor housing, the arrangements of the output terminals 52U, 52V and 52W of the first power conversion circuit 30 and the output terminals 53U, 53V and 53W of the second power conversion circuit 31, the positive-electrode-side power terminals 34 and 35 and the negative-electrode-side power terminals 40 and 41 may be changed in accordance with the curved surface of the motor housing.

As shown in FIG. 5, the gate input terminals for the respective MOSFETs are disposed around the power conversion circuits 30 and 31 as shown in FIG. 5. The gate input terminals for the high-potential-side MOSFETs 36U, 36V and 36W of the first power conversion circuit 30 are arranged, as a first U-phase high-potential-side gate input terminal 54U, a first V-phase high-potential-side gate input terminal 54V and a first W-phase high-potential-side gate input terminal 54W, at a location adjacent to the high-potential-side MOSFET 36U on the upper side in the figure.

The gate input terminals for the high-potential-side MOSFETs 37U, 37V and 37W of the second power conversion circuit 31 are arranged, as a second U-phase high-potential-side gate input terminal 55U, a second V-phase high-potential-side gate input terminal 55V and a second W-phase high-potential-side gate input terminal 55W, at a location adjacent to the high-potential-side MOSFET 37U on the upper side in the figure.

Namely, the first U-phase high-potential-side gate input terminal 54U, the first V-phase high-potential-side gate input terminal 54V, the first W-phase high-potential-side gate input terminal 54W, the second U-phase high-potential-side gate input terminal 55U, the second V-phase high-potential-side gate input terminal 55V and the second W-phase high-potential-side gate input terminal 55W are arranged adjacent to the periphery of the mounting substrate 19.

The gate input terminals for the low-potential-side MOSFETs 44U, 44V and 44W of the first power conversion circuit 30 are arranged, as a first U-phase low-potential-side gate input terminal 56U, a first V-phase low-potential-side gate input terminal 56V and a first W-phase low-potential-side gate input terminal 56W, at locations adjacent to the low-potential-side MOSFETs 44U and 44W on the upper and lower sides in the figure.

The gate input terminals for the low-potential-side MOSFETs 45U, 45V and 45W of the second power conversion circuit 31 are arranged, as a second U-phase low-potential-side gate input terminal 57U, a second V-phase low-potential-side gate input terminal 57V and a second W-phase low-potential-side gate input terminal 57W, at locations adjacent to the low-potential-side MOSFETs 45U and 45W on the upper and lower sides in the figure.

Namely, the first U-phase low-potential-side gate input terminal 56U, the first V-phase low-potential-side gate input terminal 56V, the first W-phase low-potential-side gate input terminal 56W, the second U-phase low-potential-side gate input terminal 57U, the second V-phase low-potential-side gate input terminal 57V and the second W-phase low-potential-side gate input terminal are also arranged adjacent to the periphery of the mounting substrate 19.

The gate input terminals for the phase relay MOSFETs 46U, 46V and 46W on the first power conversion circuit 30 are disposed, as a first V-phase relay gate input terminal 58U, a first V-phase relay gate input terminal 58V and a first W-phase relay gate input terminal 58W, at locations adjacent to the phase relay MOSFETs 46U and 46W on the upper and lower sides in the figure.

The gate input terminals for the phase relay MOSFETs 47U, 47V and 47W on the second power conversion circuit 31 are arranged, as a second U-phase relay gate input terminal 59U, a second V-phase relay gate input terminal 59V and a second W-phase relay gate input terminal 59W, at locations adjacent to the phase relay MOSFETs 46U and 46W on the upper and lower sides in the figure.

Namely, the first U-phase relay gate input terminal 58U, the first V-phase relay gate input terminal 58V, the first W-phase relay gate input terminal 58W, the second U-phase gate input terminal 59U, the second V-phase relay gate input terminal 59V and the second W-phase relay gate input terminal 59W are also arranged adjacent to the periphery of the mounting substrate 19.

As mentioned above, the gate input terminals 54U to 54W, 55U to 55W, 56U to 56W, 57U to 57W, 58U to 58W and 59U to 59W for the high-potential-side MOSFETs 36U to 36W and 37U to 37W, the low-potential-side MOSFETs 44U to 44W and 45U to 45W and the phase relay MOSFETs 46U to 46W and 47U to 47W are arranged on the peripheral parts of the second mounting substrate 19 along the arrangement directions of the respective MOSFETs. This allows easy arrangement of gate signal lines between the gate input terminals and the MOSFETs along the negative-electrode-side power lines 38 and 39 and the connection wiring sections 42U to 42W and 43U to 43W so as to thereby shorten the wiring length.

Figure 6:
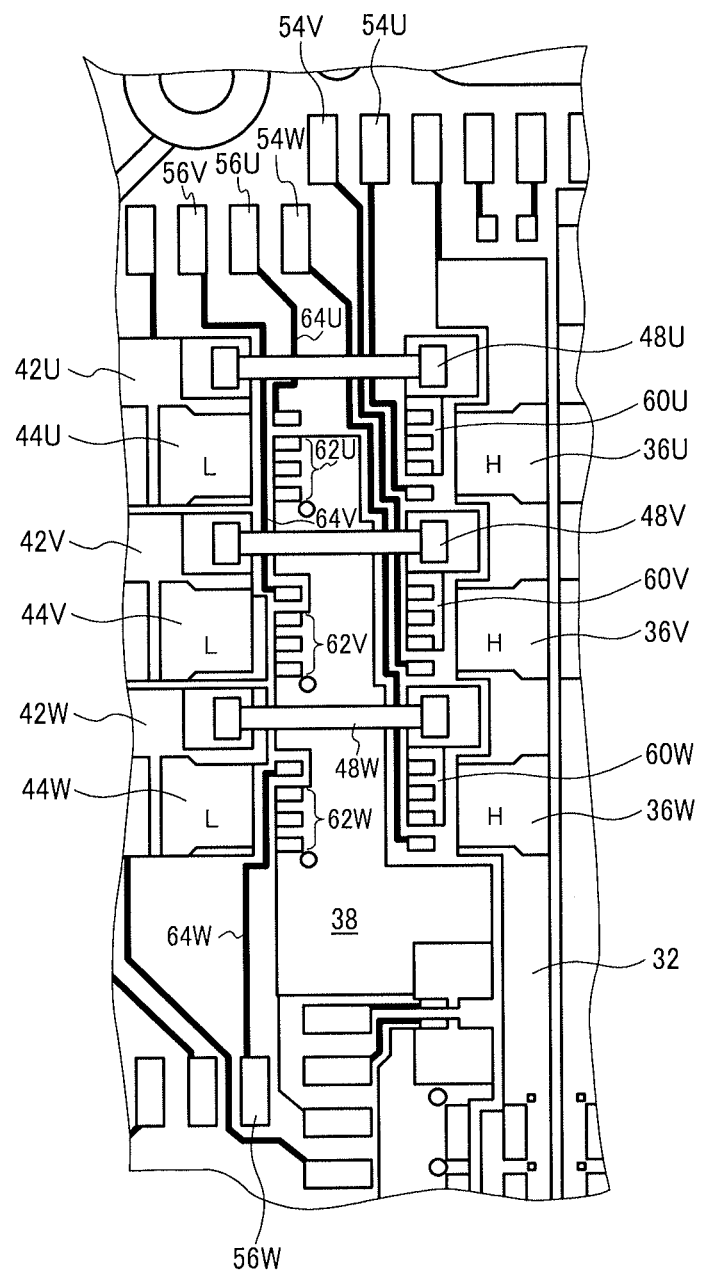
FIG. 6 is an enlarged top view of a part of the power conversion circuit portion of FIG. 5.

The wiring configuration of the gate signal lines for the high-potential-side MOSFETs 36U to 36W and 37U to 37W and the low-potential-side MOSFETs 44U to 44W and 45U to 45W are as shown in FIG. 6. Although the gate signal line wiring configuration of the first power conversion circuit 30 is specifically shown in FIG. 6 (detail view), the gate signal line wiring configuration of the second power conversion circuit 31 is similar to the gate signal line wiring configuration of the first power conversion circuit 30.

As shown in FIG. 6, there are provided first high-potential-side MOSFET connection sections 60U to 60W so that the gates of the high-potential-side MOSFETs 36U to 36W to which the gate signal lines are connected as well as the corresponding sources are situated on these connection sections. The respective phase first high-potential-side MOSFET connection sections 60U to 60W are arranged at predetermined intervals, preferably at equal intervals, between the first positive-electrode-side power line 32 and the first negative-electrode-side power line 38. The terminals on the first high-potential-side MOSFET connection sections 60U to 60W are directed toward the first positive-electrode-side power line 32.

Consequently, the first high-potential-side MOSFET connection sections 60U to 60W for the respective phases of the electric motor can be located along the first positive-electrode-side power line 32. It is thus possible to prevent the shape of the first positive-electrode-side power line 32 from becoming complicated.

There are also provided first low-potential-side MOSFET connection sections 62U to 62W along the first negative-electrode-side power line 38, which is opposed to and faces the first connection wiring sections 42U to 42W, at positions corresponding to the first high-potential-side MOSFET connection sections 60U to 60W.

The respective phase first low-potential-side MOSFET connection sections 62U to 62W are arranged at predetermined intervals, preferably at equal intervals, on the first negative-electrode-side power line 38. The terminals on the first low-potential-side MOSFET connection sections 62U to 62W are directed toward the low-potential-side MOSFETs 44U to 44W.

The first low-potential-side MOSFET connection sections 62U to 62W for the respective phases of the electric motor can consequently be located along the first positive-electrode-side power line 32. It is thus also possible to prevent the shape of the first positive-electrode-side power line 32 from becoming complicated.

In the first embodiment, the gate signal lines 64 for the low-potential-side MOSFETS 44U to 44W are provided between the first low-potential-side MOSFET connection sections 62 to 62W and the first connection wiring sections 42U to 42W. In this case, the gate signal line 64V for the low-potential-side MOSFET (first V-phase) 44V can be arranged without using a jumper wire. As shown in FIG. 6, the gate signal line 64V for the low-potential-side MOSFET (first V-phase) 44V crosses over the low-potential-side MOSFET (first U-phase) 44U. The gate signal line 64V thus needs to be arranged so as not to interfere with the low-potential-side MOSFET (first U-phase) 44U.

Figure 7:
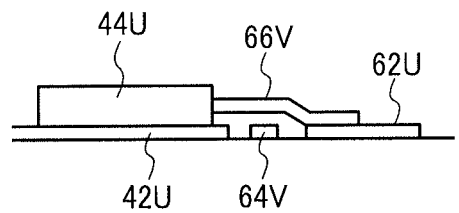
FIG. 7 is a sectional view of a part of the power conversion circuit portion in the vicinity of a negative-electrode-side power line shown in FIG. 6.

As shown in FIG. 7, the gate signal line 64V for the low-potential-side MOSFET (first V-phase) lies between the first low-potential-side MOSFET connection section 62U and the first connection wiring section 42U in the first embodiment. Further, a terminal lead 66V is made of Cu material or the like so as to extend over the gate signal line 64 and make a connection between the first low-potential-side MOSFET connection section 62U and the low-potential-side MOSFET (first U-phase) 44U as shown in FIG. 7. This reduces the use of a jumper wire and thereby leads to a decrease in mounting area, a reduction in cost and a suppression of increase in inductance.

As described above, the power conversion circuit portion according to the first embodiment is so structured that: two positive-electrode-side power lines and two negative-electrode-side power lines are arranged on substantially the center of the mounting substrate; the respective phase MOSFETs of the power conversion circuits for drive control of the electric motor are arranged on both sides of the mounting substrate with respect to the two positive-electrode-side power lines and the two negative-electrode-side power lines; and the output terminals for connection to the electric motor are arranged on the mounting substrate at a location outward of the power conversion circuits.

In the first embodiment, the redundant power conversion circuits are arranged substantially symmetrically from the center to the periphery of the mounting substrate as mentioned above. This arrangement leads to a shorter wiring length and smaller mounting area of the mounting substrate. It is therefore possible to prevent a radial size increase of the mounting substrate on which the redundant power conversion circuits are mounted.

Embodiment 2

Next, the second embodiment of the present invention will be described below with reference to FIG. 8. The second embodiment is basically similar in configuration to the first embodiment, except for the arrangement positions of the high-potential-side MOSFETs and the arrangement positions of the jumper wires between the high-potential-side MOSFETs and the low-potential-side MOSFETs. The basic features and effects of the second embodiment are the same as those of the first embodiment. The following explanation will be given of the other features and effects.

As the configuration of the second embodiment is basically similar to that of the first embodiment, any structural parts and portions, other than those that need to be explained below, are not given reference numerals in FIG. 8 but could be understood by reference to FIG. 5.

Figure 8:
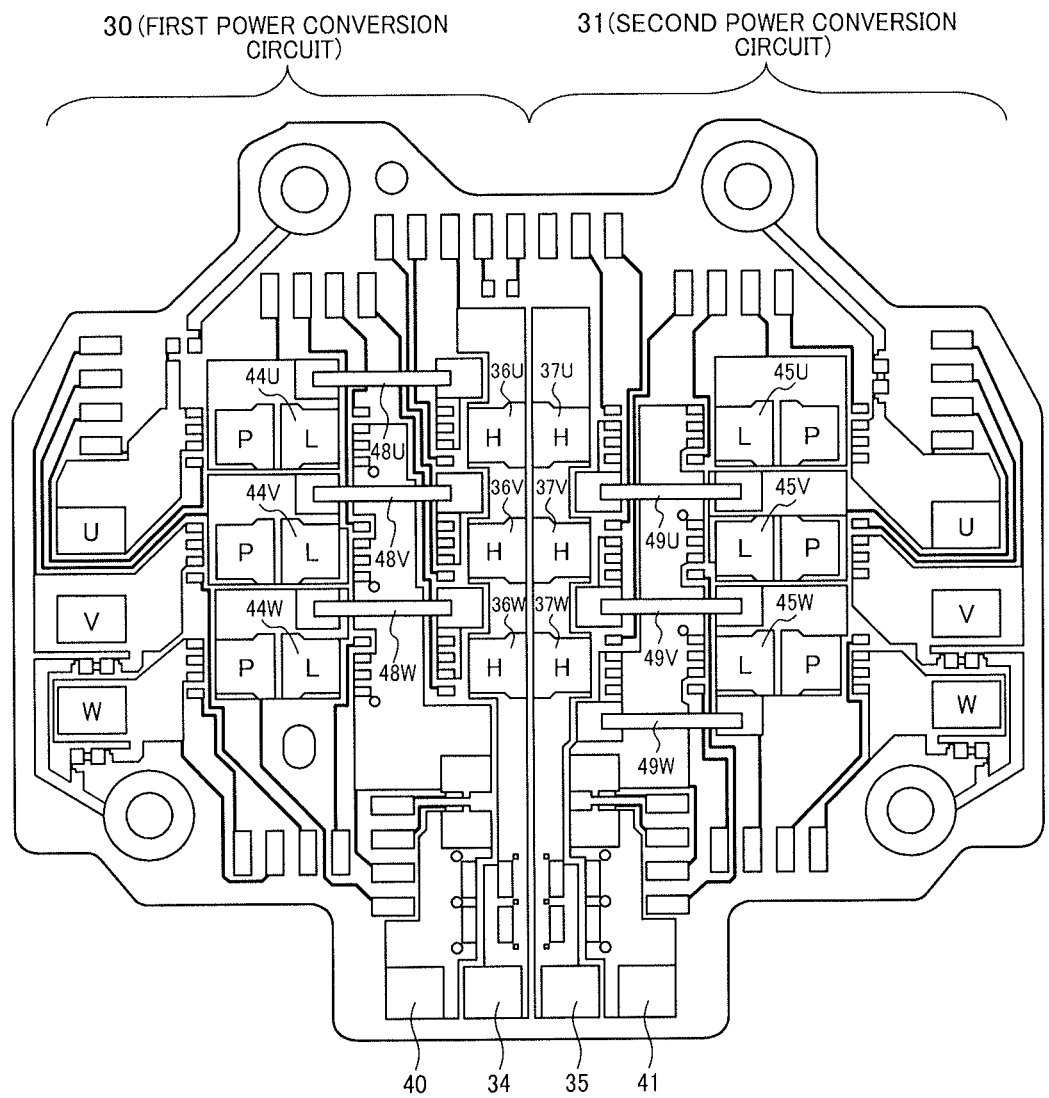
FIG. 8 is a top view of a power conversion circuit portion in which redundant power conversion circuits are mounted on a mounting substrate according to a second embodiment of the present invention.

As shown in FIG. 8, the first power conversion circuit 30 of the second embodiment is the same in configuration as that of the first embodiment. On the other hand, the second power conversion circuit 31 of the second embodiment is structured as follows. The high-potential-side MOSFETS 37U to 37W are respectively opposed to the high-potential-side MOSFETs 36U to 36W of the first power conversion circuit 30 on the same lines. The jumper wires 49U to 49W are connected to the lower sides of the high-potential-side MOSFETs 37U to 37W in FIG. 8 (closer to the second positive- and negative-electrode-side power terminals 35 and 41), which are opposite to those in the first embodiment.

The high-potential-side MOSFETs 37U to 37W and the low-potential-side MOSFETs 45U to 45W are respectively opposed to each other on the same lines. The jumper wires 49U to 49W are connected to the lower sides of the low-potential-side MOSFETs 45U to 45 in FIG. 8, which are opposite to those in the first embodiment. The high-potential-side MOSFETs 37U to 37W and the low-potential-side MOSFETs 45U to 45W are thus connected at the lower sides thereof to each other by the jumper wires 49U to 49W.

As a consequence, the jumper wires 49U to 49W of the second power conversion circuit 31 are shifted by an amount of one MOSFET toward the lower side (i.e. toward the second positive- and negative-electrode-side power terminals 35 and 41) relative to the jumper wires 48U to 48W of the first power conversion circuit 30. As the jumper wires 49U to 49W of the second power conversion circuit 31 are positioned at a relatively lower side, it is possible to make effective use of the mounting surface of the mounting substrate 19 which is shaped according to the cylindrical ECU housing 11B.

For example, in the case where the high-potential-side MOSFETs 36U, 36V and 36W and the high-potential-side MOSFETs 37U, 37V and 37W are brought together with the jumper wires in a butting manner in the vicinity of the center of the mounting substrate 19, the peripheral side jumper wires are located close to the peripheral edge of the mounting substrate 19. The sufficient mounting area cannot be obtained for such peripheral side part. In order to ensure the mounting area for the peripheral side part, it is necessary to enlarge the mounting substrate.

In the case where the jumper wires are arranged as shown in FIG. 8 in the second embodiment, by contrast, only one jumper wire is located close to the peripheral edge of the mounting substrate 19. It is thus possible to obtain the sufficient mounting area for the peripheral side part.

Embodiment 3

The third embodiment of the present invention will be next described below with reference to FIG. 9. The third embodiment is different from the first embodiment, in that the positional relationship of the positive- and negative-electrode-side power lines is changed such that the positive-electrode-side power lines are arranged adjacent to and outward of the negative-electrode-side power lines; and the arrangement directions of the high-potential-side MOSFETs and the low-potential-side MOSFETs are changed according to the positional relationship of the positive- and negative-electrode-side power lines.

The basic features and effects of the third embodiment are the same as those of the first embodiment. The following explanation will be given of the other features and effects.

Figure 9:
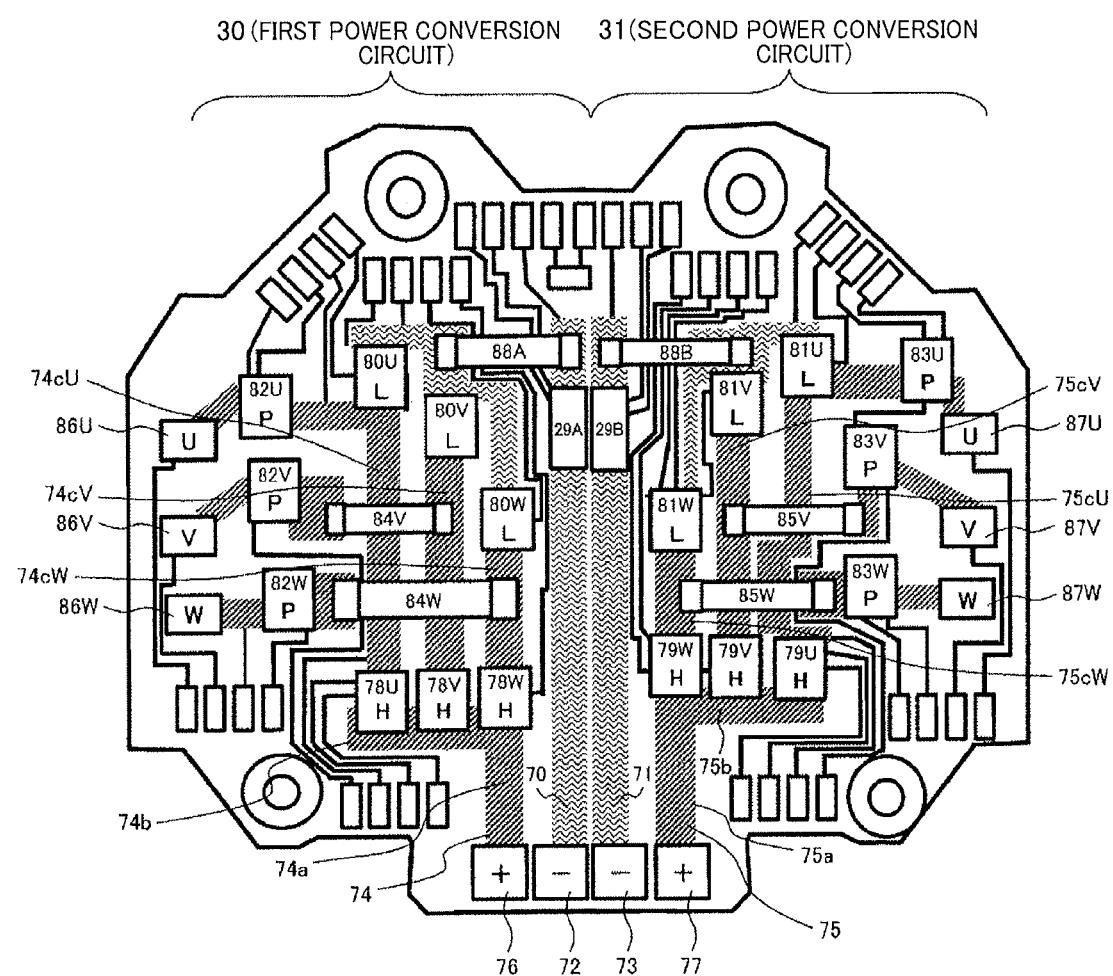
FIG. 9 is a top view of a power conversion circuit portion in which redundant power conversion circuits are mounted a mounting substrate according to a third embodiment of the present invention.

In FIG. 9, any structural parts and portions other than those that need to be explained below are not given reference numerals. As the configuration of the gate signal lines and the like of the third embodiment is basically the same as or similar to that of the first embodiment, a repeated explanation thereof will be omitted herefrom.

As shown in FIG. 9, the wiring pattern for connection to the drains, sources and gates of the respective MOSFETs is printed on the insulating surface region 28 of the second mounting substrate 19. In the vicinity of the center C of the second mounting substrate 19, the first negative-electrode-side power line 70 for the first power conversion circuit 30 and the second positive-electrode-side power line 71 for the second power conversion circuit 31 are insulatedly arranged adjacent to each other at a predetermined interval so as to lie vertically across the second mounting substrate 19 from the first and second negative-electrode-side power terminal 72 and 73 toward the opposite peripheral side as shown in FIG. 9.

Each of the first and second negative-electrode-side power lines 70 and 71 has a predetermined width and extends substantially linearly through the vicinity of the center of the mounting substrate 19. The negative-electrode-side power lines 70 and 71 each function as a common connection part of the sources SB of the respective phase low-potential-side MOSFETs. These negative-electrode-side power lines 70 and 71 are connected to the corresponding first and second negative-electrode-side power terminals 72 and 73.

The first and second positive-electrode-side power lines 74 and 75 arranged on both peripheral sides (outer sides) of the mounting substrate 19 with respect to the negative-electrode-side power lines 70 and 71. The first and second positive-electrode-side power lines 74 and 75 respectively include: sections extending in parallel with the negative-electrode-side power lines 70 and 71: and sections having a predetermined width and extending substantially linearly perpendicularly from such parallel sections toward the outer peripheral sides in parallel with each other.

More specifically, the first and second positive-electrode-side power lines 75 and 75 include: first wiring sections 74a and 75a situated on opposite sides of the negative-electrode-side power lines 70 and 71; second wiring sections 74b and 75b each bent from the first wiring section 74a 75a toward the outer peripheral side on which the after-mentioned first U-phase, V-phase and W-phase output terminal 86U, 86V and 86W or second U-phase, V-phase and W-phase output terminals 87U, 87V and 87W are disposed; and third wiring sections 74cU, 74cV, 74cW, 75cU, 75cV and 75cW facing the second wiring sections 74b and 75b via insulating areas and extending along the wiring direction of the negative-electrode-side power lines 70 and 71.

The third wiring sections 74cU, 74cV, 74cW, 75cU, 75cV and 75cW are provided to the respective winding phases of the electric motor M.

The positive-electrode-side power lines 74 and 75 are connected to the corresponding first and second positive-electrode-side power terminals 74 and 75. The first and second positive-electrode-side power lines 76 and 77 each function as a common connection part of the drains DA of the respective phase high-potential-side MOSFETs as shown in FIG. 4.

The high-potential-side MOSFETs for the respective phases are disposed on the second wiring section 74b of the first positive-electrode-side power line 74. As shown in FIG. 9, the high-potential-side MOSFET (first W-phase) 78W, the high-potential-side MOSFET (first V-phase) 78V and the high-potential-side MOSFET (first U-phase) 78U are aligned in this order toward the outer peripheral side with respect to the first negative-electrode-side power line 70.

The high-potential-side MOSFETs for the respective phases are also disposed OD the second wiring section 75b of the second positive-electrode-side power line 75. As shown in FIG. 9, the high-potential-side MOSFET (second W-phase) 79W, the high-potential-side MOSFET (second V-phase) 79V and the high-potential-side MOSFET (second U-phase) 79U are aligned in this order toward the outer peripheral side with respect to the second negative-electrode-side power line 71.

The arrangement order of the MOFETs for these three phases is arbitrary. The arrangement positions of the MOSFETs are set as appropriate depending on the positions of the output terminals of the electric driving device.

The low-potential-side MOSFETs for the respective phases are insulatedly disposed on the third wiring sections 74cW, 74cV and 74cU of the first positive-electrode-side power line 74, which extend from the high-potential-side MOSFET (first W-phase) 78W, the high-potential-side MOSFET (first V-phase) 78V and the high-potential-side MOSFET (first U-phase) 78U. The low-potential-side MOSFET (first W-phase) 80W, the low-potential-side MOSFET (first V-phase) 80V and the low-potential-side MOSFET (first U-phase) 80U are arranged in this order toward the outer peripheral side with respect to the first negative-electrode-side power line 70.

The low-potential-side MOSFETs for the respective phases are also insulatedly disposed on the third wiring sections 75cW, 75cV and 75cU of the second positive-electrode-side power line 75, which extend from the high-potential-side MOSFET (second W-phase) 79W, the high-potential-side MOSFET (second V-phase) 79V and the high-potential-side MOSFET (second U-phase) 79U. The low-potential-side MOSFET (second W-phase) 81W, the low-potential-side MOSFET (second V-phase) 81V and the low-potential-side MOSFET (second U-phase) 81U are arranged in this order toward the outer peripheral side with respect to the second negative-electrode-side power line 71.

The phase relay MOSFETs for the respective phases are insulatedly disposed on the outer peripheral side of the second mounting substrate 19 substantially in parallel with the first negative-electrode-side power line 70. The phase relay MOSFET (first U-phase) 82U, the phase relay MOSFET (first V-phase) 82V and the phase relay MOSFET (first W-phase) 82W are arranged in this order from the upper side in FIG. 9 (i.e. the outer peripheral side opposite to the outer peripheral side on which the first and second negative-electrode-side power terminals 72 and 73 are disposed).

The phase relay MOSFETs for the respective phases are also insulatedly disposed on the outer peripheral side of the second mounting substrate 19 substantially in parallel with the second negative-electrode-side power line 71. The phase relay MOSFET (second U-phase) 83U, the phase relay MOSFET (second V-phase) 83V and the phase relay MOSFET (second W-phase) 83W are arranged in this order from the upper side in FIG. 9.

The third wiring section 74cW of the first positive-electrode-side power line 74, which extends between the high-potential-side MOSFET (first W-phase) 78W and the low-potential-side MOSFET (first W-phase) 80W, is connected to the phase relay MOSFET (first W-phase) 82W by the jumper wire 84W. The third wiring section 74cV of the first positive-electrode-side power line 74, which extends between the high-potential-side MOSFET (first V-phase) 78V and the low-potential-side MOSFET (first V-phase) 80V, is connected to the phase relay MOSFET (first V-phase) 82V by the jumper wire 84V.

The third wiring section 75cW of the second positive-electrode-side power line 75, which extends between the high-potential-side MOSFET (second W-phase) 79W and the low-potential-side MOSFET (second W-phase) 81W, is connected to the phase relay MOSFET (second W-phase) 83W by the jumper wire 85W. The third wiring section 75cV of the second positive-electrode-side power line 75, which extends between the high-potential-side MOSFET (second V-phase) 79V and the low-potential-side MOSFET (second V-phase) 81V, is connected to the phase relay MOSFET (second V-phase) 83V by the jumper wire 85V.

The first negative-electrode-side power line 70 and the negative electrode sides of the low-potential-side MOSFET (first U-phase) 80U to the low-potential-side MOSFET (first W-phase) 80W are connected together by the jumper wire 88A. The second negative-electrode-side power line 71 and the negative electrode sides of the low-potential-side MOSFET (second U-phase) 81U to the low-potential-side MOSFET (second W-phase) 81W are connected together by the jumper wire 88B.

As in the case of the first embodiment, the first U-phase output terminal 86U, the first V-phase output terminal 86V and the first W-phase output terminal 86W are arranged in this order from the upper side (i.e. the peripheral side opposite to the peripheral side on which the first and second negative-electrode-side power terminals 72 and 73) in the vicinity of the peripheral edge of the second mounting substrate 19. The second U-phase output terminal 87U, the second V-phase output terminal 87V and the second W-phase output terminal 87W are also arranged in this order from the upper side (i.e. the outer peripheral side opposite to the outer peripheral side on which the first and second negative-electrode-side power terminals 72 and 73).

As mentioned above, the power conversion circuits are arranged from the center to the periphery of the mounting substrate in the third embodiment. This arrangement leads to a shorter wiring length and smaller mounting area for the power conversion circuits. It is therefore possible to suppress a radial size increase of the mounting substrate on which the redundant power conversion circuits are mounted.

Figure 10:
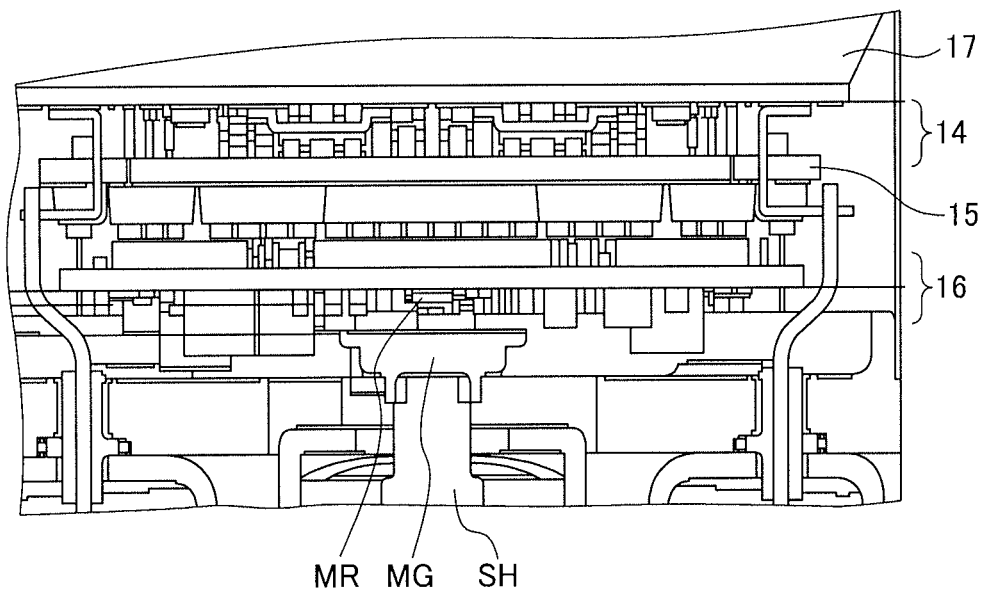
FIG. 10 is a vertical sectional view of a part of the electric power steering device.

In the third embodiment, the magnetism detection element is arranged to operate in synchronism with the sensor magnet MG, which is fixed to the rotation shaft of the electric motor, and detect the rotation speed and phase of the electric motor as shown in FIG. 10. More specifically, the sensor magnet MG is fixed to a front end of the rotation shaft SH of the electric motor. The magnetism detection element MR is disposed on the control circuit portion 16 at a position close to the sensor magnet MG As the sensor magnet is fixed to the rotation shaft SH, the magnetism detection element MR is located close to the rotation shaft SH.

The magnetism detection element MR may be influenced by electrical noise. When the MOSFETs of the power conversion circuit are located in the vicinity of the magnetism detection element, for example, it becomes highly likely that the magnetism detection element MR will be influence by electrical noise due to switching of the MOSFETs. In the third embodiment, the first and second negative-electrode-side power lines are arranged in the center of the mounting substrate as mentioned above. Thus, the high-potential-side MOSFETs and the low-potential-side MOSFETS can be disposed at positions away from the magnetism detection element MR so that it is possible to lower the degree of influence exerted on the magnetism detection element MR by electric noise due to switching of the MOSFETs.

As described above, the present invention is characterized in that: two positive-electrode-side power lines and two negative-electrode-side power lines are arranged adjacent to each other on substantially the center of the mounting substrate; power conversion circuits for drive control of the electric motor are arranged on both sides of the mounting substrate with respect to the two positive-electrode-side power lines and the two negative-electrode-side power lines; and output terminals for connection to the electric motor are arranged on the mounting substrate at a location outward of the power conversion circuits.

As the power conversion circuits are arranged from the center to the periphery of the mounting substrate in the present invention, it is possible to attain a shorter wiring length and smaller mounting area for the power conversion circuits and thereby possible to suppress a radial size increase of the mounting substrate on which the redundant power conversion circuits are mounted.

Further, it is feasible to shape the second mounting substrate 19 according to the outside shape of the ECU housing 11B. For example, the second mounting substrate 19 may be made more circular than in the above embodiments. The second mounting substrate 19 may alternatively be formed into any other shape such as rectangular shape or combined shape thereof.

Although six MOSFETs are provided as inverter circuit components in each of the first and second power conversion circuits in the above embodiments, it is alternatively feasible to avoid the use of phase relay MOSFETs.

It is feasible to change the stacking order (arrangement order) of the control circuit portion 16, the first mounting substrate 18 and the second mounting substrate 19 relative to the motor M as appropriate.

Moreover, it is feasible to integrate at least part of functional circuits and electronic components of the control circuit portion into the second mounting substrate 19 by high-density packing.

The present invention is not limited to the above-mentioned embodiments. Various changes and modifications can be made within the scope of the present invention. For example, the above embodiments are merely for the purpose of illustration of the present invention. The present invention does not necessarily include all of the features described with reference to the above embodiments. Any of the features of one embodiment may be substituted by those of the other embodiment. Any of the features of one embodiment may be incorporated into the other embodiment. It is conceivable to add, eliminate or replace any of the features of the above respective embodiments.

For example, the present invention can be implemented by the following aspects on the basis of the above-mentioned embodiments.

In accordance with one aspect of the present invention, there is provided an electric driving device, comprising: an electric motor arranged to drive a mechanical control element; and an electronic control unit arranged, on a side opposite to an output shaft of the electric motor, to control the electric motor, the electronic control unit comprising: a ECU housing coupled to a motor housing in which the electric motor is installed; and a power conversion circuit portion installed in the ECU housing and configured to perform drive control of the electric motor, wherein the power conversion circuit portion comprises at least: two positive-electrode-side power lines and two negative-electrode-side power lines arranged adjacent to each other on a mounting substrate from an outer peripheral side to an inner side of the mounting substrate; two power conversion circuits arranged on both sides of the mounting substrate, with respect to the two positive-electrode-side power lines and the two negative-electrode-side power lines, and each configured to drive and control the electric motor; and output terminals arranged on the mounting substrate at a location outward of the power conversion circuits and being connected to the electric motor.

In accordance with another aspect of the present invention, there is provided an electric driving device, comprising: an electric motor arranged to drive a mechanical control element; and an electronic control unit arranged, on a side opposite to an output shaft of the electric motor, to control the electric motor, the electronic control unit comprising: an ECU housing coupled to a motor housing in which the electric motor is installed; and an electronic control assembly installed in the ECU housing and configured to perform drive control of the electric motor, wherein the electronic control assembly comprises: a power supply circuit portion that functions to generate electric power; a power conversion circuit portion that functions to drive the electric motor; and a control circuit portion that functions to control the power conversion circuit portion, and wherein the power conversion circuit portion comprises at least: two positive-electrode-side power lines and two negative-electrode-side power lines arranged adjacent to each other on a mounting substrate from an outer peripheral side to an inner side of the mounting substrate; two power conversion circuits arranged on both sides of the mounting substrate, with respect to the two positive-electrode-side power lines and the two negative-electrode-side power lines, and each configured to drive and control the electric motor; and output terminals arranged on the mounting substrate at a location outward of the power conversion circuits and being connected to the electric motor.

In accordance with a preferable aspect of the present invention, there is provided the electric driving device as described above, wherein the power conversion circuit portion is so structured that: the two positive-electrode-side power lines are arranged to extend from the outer peripheral side to the inner side of the mounting substrate; the two negative-electrode-side power lines are arranged adjacent to and outward of the two positive-electrode-side power lines; high-potential-side power switching elements are disposed on each of the two positive-electrode-side power lines; low-potential-side power switching elements are disposed outward of each of the two negative-electrode-side power lines; the high-potential-side power switching elements and the low-potential-side power switching elements are respectively connected in series to each other between the positive- and negative-electrode-side power lines; phase relay power switching elements are disposed outward of the low-potential-side power switching elements; the output terminals are disposed outward of the phase relay power switching elements; and the phase relay power switching elements are configured to control power supply between the output terminals and connection points of the high-potential-side power switching elements and the low-potential-side power switching elements.

In accordance with another preferable aspect of the present invention, there is provided the electric driving device as described above, wherein the two positive-electrode-side power lines and the two negative-electrode-side power lines are each formed in a linear shape so as to divide the mounting substrate; wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are arranged along a wiring direction of the positive-electrode-side power line; wherein the low-potential-side power switching elements include, as three respective phase low-potential-side power switching elements, a low-potential-side U-phase power switching element, a low-potential-side V-phase power switching element and a low-potential-side W-phase power switching element connected to the high-potential-side U-phase power switching element, the high-potential-side V-phase power switching element and the high-potential-side W-phase power switching element, respectively, and arranged along the wiring direction of the positive-electrode-side power line; wherein the phase relay power switching elements include, as three respective phase relay power switching elements, a U-phase relay power switching element, a V-phase relay power switching element and a W-phase relay power switching element arranged along the wiring direction of the positive-electrode-side power line; and wherein the output terminals include, as three respective phase output terminals, a U-phase output terminal, a V-phase output terminal and a W-phase output terminal arranged along the wiring direction of the positive-electrode-side power line.

In accordance with another preferable aspect of the present invention, there is provided the electric driving device as described above, wherein the three respective phase high-potential-side power switching elements on one of the positive-electrode-side power lines are shifted in position in the wiring direction relative to the three respective phase high-potential-side power switching elements on the other of the positive-electrode-side power lines.

In accordance with another preferable aspect of the present invention, there is provided the electric driving device as described above, wherein the three respective phase high-potential-side power switching elements on the one of the positive-electrode-side power lines are connected to the corresponding three respective phase low-potential-side power switching elements by first jumper wires; wherein the three respective phase high-potential-side power switching elements on the other of the positive-electrode-side power lines are connected to the corresponding three respective phase low-potential-side power switching elements by second jumper wires; and wherein the first jumper wires and the second jumper wires are substantially symmetrical in position with respect to the positive-electrode-side power lines.

In accordance with another preferable aspect of the present invention, there is provided the electric driving device as described above, wherein the three respective phase high-potential-side power switching elements on the one of the positive-electrode-side power lines are opposed to the three respective phase high-potential-side power switching elements on the other of the positive-electrode-side power lines.

In accordance with another preferable aspect of the present invention, there is provided the electric driving device as described above, wherein the three respective phase high-potential-side power switching elements on the one of the positive-electrode-side power lines are connected to the corresponding three respective phase low-potential-side power switching elements by first jumper wires; wherein the three respective phase high-potential-side power switching elements on the other of the positive-electrode-side power lines are connected to the corresponding three respective phase low-potential-side power switching elements by second jumper wires; and wherein the first jumper wires and the second jumper wires are shifted in position relative to each other in the wiring direction of the positive-electrode-side power line.

In accordance with another preferable aspect of the present invention, there is provided the electric driving device as described above, wherein the power conversion circuit portion is so structured that: the two negative-electrode-side power lines are arranged to extend from the outer peripheral side to the inner side of the mounting substrate; the two positive-electrode-side power lines are arranged adjacent to and outward of the two negative-electrode-side power lines; high-potential-side power switching elements are disposed on each of the two positive-electrode-side power lines; low-potential-side power switching elements are disposed along each of the two negative-electrode-side power lines; the high-potential-side power switching elements and the low-potential-side power switching elements are respectively connected in series to each other between the positive- and negative-electrode-side power lines; phase relay power switching elements are disposed outward of the high-potential-side power switching elements and the low-potential-side power switching elements; the output terminals are disposed outward of the phase relay power switching elements; and the phase relay power switching elements are configured to control power supply between the output terminals and connection points of the high-potential-side power switching elements and the low-potential-side power switching elements.

In accordance with another preferable aspect of the present invention, there is provided the electric driving device as described above, wherein the two negative-electrode-side power lines are each formed in a linear shape so as to divide the mounting substrate; wherein the two positive-electrode-side power lines each include: a first wiring section extending along the negative-electrode-side power line; a second wiring section extending in a different direction from the first wiring section; and third wiring sections facing the second wiring section via insulating areas and extending along the negative-electrode-side power line; wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are disposed on the second wiring section and respectively connected to the third wiring sections; wherein the low-potential-side power switching elements include, as three respective phase low-potential-side power switching elements, a low-potential-side U-phase power switching element, a low-potential-side V-phase power switching element and a low-potential-side W-phase power switching element respectively disposed on the third wiring sections; wherein the phase relay power switching elements include, as three respective phase relay power switching elements, a U-phase relay power switching element, a V-phase relay power switching element and a W-phase relay power switching element arranged in order of mention along the wiring direction of the negative-electrode-side power line; and wherein the output terminals include, as three respective phase output terminals, a U-phase output terminal, a V-phase output terminal and a W-phase output terminal arranged in order of mention along the wiring direction of the negative-electrode-side power line.

In accordance with still another aspect of the present invention, there is provided an electric power steering device, comprising: an electric motor arranged to apply a steering assist force to a steering shaft; and an electronic control unit arranged, on a side opposite to an output shaft of the electric motor, to control the electric motor, the electronic control unit comprising: an ECU housing coupled to a motor housing in which the electric motor is installed; and an electronic control assembly installed in the ECU housing and configured to perform drive control of the electric motor, wherein the electronic control assembly comprises: a power supply circuit portion mounted on a metal substrate and functioning to generate electric power; a power conversion circuit portion mounted on a metal mounting substrate and functioning to drive the electric motor; and a control circuit portion mounted on a resin substrate and functioning to control the power conversion circuit portion, and wherein the power conversion circuit portion comprises at least: two positive-electrode-side power lines and two negative-electrode-side power lines arranged adjacent to each other on the mounting substrate from an outer peripheral side to an inner side of the mounting substrate; two power conversion circuits arranged on both sides of the mounting substrate, with respect to the two positive-electrode-side power lines and the two negative-electrode-side power lines, and each configured to drive and control the electric motor; and output terminals arranged on the mounting substrate at a location outward of the power conversion circuits and being connected to the electric motor.

In accordance with a preferable aspect of the present invention, there is provided the electric power steering device as described above, wherein the power conversion circuit portion is so structured that: the two positive-electrode-side power lines are arranged to extend from the outer peripheral side to the inner side of the mounting substrate; the two negative-electrode-side power lines are arranged adjacent to and outward of the two positive-electrode-side power lines; high-potential-side power switching elements are disposed on each of the two positive-electrode-side power lines; low-potential-side power switching elements are disposed outward of each of the two negative-electrode-side power lines; the high-potential-side power switching elements and the low-potential-side power switching elements are respectively connected in series to each other between the positive and negative-electrode-side power lines; phase relay power switching elements are disposed outward of the low-potential-side power switching elements; the output terminals are disposed outward of the phase relay power switching elements; and the phase relay power switching elements are configured to control power supply between the output terminals and connection points of the high-potential-side power switching elements and the low-potential-side power switching elements.

In accordance with another preferable aspect of the present invention, there is provided the electric power steering device as described above, wherein the two positive-electrode-side power lines and the two negative-electrode-side power lines are each formed in a linear shape so as to divide the mounting substrate; wherein the high-potential-side power switching elements include, as three respective phase high-potential-side power switching elements, a high-potential-side U-phase power switching element, a high-potential-side V-phase power switching element and a high-potentialside W-phase power switching element configured to respectively control power supplied to a U-phase coil, a V-phase coil and a W-phase coil of the electric motor, such that the three respective phase high-potential-side power switching elements are arranged along a wiring direction of the positive-electrode-side power line; wherein the low-potential-side power switching elements include, as three respective phase low-potential-side power switching elements, a low-potential-side U-phase power switching element, a low-potential-side V-phase power switching element and a low-potential-side W-phase power switching element connected to the high-potential-side U-phase power switching element, the high-potential-side V-phase power switching element and the high-potential-side W-phase power switching element, respectively, and arranged along the wiring direction of the positive-electrode-side power line; wherein the phase relay power switching elements include, as three respective phase relay power switching elements, a U-phase relay power switching element, a V-phase relay power switching element and a W-phase relay power switching element arranged along the wiring direction of the positive-electrode-side power line; and wherein the output terminals include, as three respective phase output terminals, a U-phase output terminal, a V-phase output terminal and a W-phase output terminal arranged along the wiring direction of the positive-electrode-side power line.

In accordance with another preferable aspect of the present invention, there is provided the electric power steering device as described above, wherein the three respective phase high-potential-side power switching elements on one of the positive-electrode-side power lines are shifted in position in the wiring direction relative to the three respective phase high-potential-side power switching elements on the other of the positive-electrode-side power lines.

In accordance with another preferable aspect of the present invention, there is provided the electric power steering device as described above, wherein the three respective phase high-potential-side power switching elements on the one of the positive-electrode-side power lines are connected to the corresponding three respective phase low-potential-side power switching elements by first jumper wires; wherein the three respective phase high-potential-side power switching elements on the other of the positive-electrode-side power lines are connected to the corresponding three respective phase low-potential-side power switching elements by second jumper wires; and wherein the first jumper wires and the second jumper wires are substantially symmetrical in position with respect to the positive-electrode-side power lines.

In accordance with another preferable aspect of the present invention, there is provided the electric power steering device as described above, wherein the three respective phase high-potential-side power switching elements on the one of the positive-electrode-side power lines are opposed to the three respective phase high-potential-side power switching elements on the other of the positive-electrode-side power lines.

In accordance with another preferable aspect of the present invention, there is provided the electric power steering device as described above,
wherein the three respective phase high-potential-side power switching elements on the one of the positive-electrode-side power lines are connected to the corresponding three respective phase low-potential-side power switching elements by first jumper wires;
wherein the three respective phase high-potential-side power switching elements on the other of the positive-electrode-side power lines are connected to the corresponding three respective phase low-potential-side power switching elements by second jumper wires; and
wherein the first jumper wires and the second jumper wires are shifted in position relative to each other in the wiring direction of the positive-electrode-side power line.

The invention claimed is:

1. An electric driving device, comprising:
an electric motor arranged to drive a mechanical control element; and
an electronic control unit arranged, on a side opposite to an output shaft of the electric motor, to control the electric motor,
the electronic control unit comprising: a ECU housing coupled to a motor housing in which the electric motor is installed; and a power conversion circuit portion installed in the ECU housing and configured to perform drive control of the electric motor,
wherein the power conversion circuit portion comprises at least:
two positive-electrode-side power lines and two negative-electrode-side power lines arranged adjacent to each other on a mounting substrate from an outer peripheral side to an inner side of the mounting substrate;
two power conversion circuits arranged on both sides of the mounting substrate, with respect to the two positive-electrode-side power lines and the two negative-electrode-side power lines, and each configured to drive and control the electric motor; and
output terminals arranged on the mounting substrate at a location outward of the power conversion circuits and being connected to the electric motor.

2. An electric driving device, comprising:
an electric motor arranged to drive a mechanical control element; and
an electronic control unit arranged, on a side opposite to an output shaft of the electric motor, to control the electric motor,
the electronic control unit comprising: an ECU housing coupled to a motor housing in which the electric motor is installed; and an electronic control assembly installed in the ECU housing and configured to perform drive control of the electric motor,
wherein the electronic control assembly comprises:
a power supply circuit portion that functions to generate electric power;
a power conversion circuit portion that functions to drive the electric motor; and
a control circuit portion that functions to control the power conversion circuit portion, and
wherein the power conversion circuit portion comprises at least:
two positive-electrode-side power lines and two negative-electrode-side power lines arranged adjacent to each other on a mounting substrate from an outer peripheral side to an inner side of the mounting substrate;
two power conversion circuits arranged on both sides of the mounting substrate, with respect to the two positive-electrode-side power lines and the two negative-electrode-side power lines, and each configured to drive and control the electric motor; and
output terminals arranged on the mounting substrate at a location outward of the power conversion circuits and being connected to the electric motor.

3. The electric driving device according to claim 1, wherein the power conversion circuit portion is so structured that:

the two positive-electrode-side power lines are arranged to extend from the outer peripheral side to the inner side of the mounting substrate;

the two negative-electrode-side power lines are arranged adjacent to and outward of the two positive-electrode-side power lines;

high-potential-side power switching elements are disposed on each of the two positive-electrode-side power lines;

low-potential-side power switching elements are disposed outward of each of the two negative-electrode-side power lines;

the high-potential-side power switching elements and the low-potential-side power switching elements are respectively connected in series to each other between the positive and negative-electrode-side power lines;

phase relay power switching elements are disposed outward of the low-potential-side power switching elements;

the output terminals are disposed outward of the phase relay power switching elements; and the phase relay power switching elements are configured to control power supply between the output terminals and connection points of the high-potential-side power switching elements and the low-potential-side power switching elements.

4. The electric driving device according to claim 3, wherein the two positive-electrode-side power lines and the two negative-electrode-side power lines are each formed in a linear shape so as to divide the mounting substrate;

wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are arranged along a wiring direction of the positive-electrode-side power line;

wherein the low-potential-side power switching elements include, as three respective phase low-potential-side power switching elements, a low-potential-side U-phase power switching element, a low-potential-side V-phase power switching element and a low-potential-side W-phase power switching element connected to the high-potential-side U-phase power switching element, the high-potential-side V-phase power switching element and the high-potential-side W-phase power switching element, respectively, and arranged along the wiring direction of the positive-electrode-side power line;

wherein the phase relay power switching elements include, as three respective phase relay power switching elements, a U-phase relay power switching element, a V-phase relay power switching element and a W-phase relay power switching element arranged along the wiring direction of the positive-electrode-side power line; and wherein the output terminals include, as three respective phase output terminals, a U-phase output terminal, a V-phase output terminal and a W-phase output terminal arranged along the wiring direction of the positive-electrode-side power line.

5. The electric driving device according to claim 4, wherein the three respective phase high-potential-side power switching elements on one of the positive-electrode-side power lines are shifted in position in the wiring direction relative to the three respective phase high-potential-side power switching elements on the other of the positive-electrode-side power lines.

6. The electric driving device according to claim 5, wherein the three respective phase high-potential-side power switching elements on the one of the positive-electrode-side power lines are connected to the corresponding three respective phase low-potential-side power switching elements by first jumper wires;

wherein the three respective phase high-potential-side power switching elements on the other of the positive-electrode-side power lines are connected to the corresponding three respective phase low-potential-side power switching elements by second jumper wires; and wherein the first jumper wires and the second jumper wires are substantially symmetrical in position with respect to the positive-electrode-side power lines.

7. The electric driving device according to claim 4, wherein the three respective phase high-potential-side power switching elements on the one of the positive-electrode-side power lines are opposed to the three respective phase high-potential-side power switching elements on the other of the positive-electrode-side power lines.

8. The electric driving device according to claim 7, wherein the three respective phase high-potential-side power switching elements on the one of the positive-electrode-side power lines are connected to the corresponding three respective phase low-potential-side power switching elements by first jumper wires;

wherein the three respective phase high-potential-side power switching elements on the other of the positive-electrode-side power lines are connected to the corresponding three respective phase low-potential-side power switching elements by second jumper wires; and wherein the first jumper wires and the second jumper wires are shifted in position relative to each other in the wiring direction of the positive-electrode-side power line.

9. The electric driving device according to claim 1, wherein the power conversion circuit portion is so structured that:

the two negative-electrode-side power lines are arranged to extend from the outer peripheral side to the inner side of the mounting substrate;

the two positive-electrode-side power lines are arranged adjacent to and outward of the two negative-electrode-side power lines;

high-potential-side power switching elements are disposed on each of the two positive-electrode-side power lines;

low-potential-side power switching elements are disposed along each of the two negative-electrode-side power lines;

the high-potential-side power switching elements and the low-potential-side power switching elements are respectively connected in series to each other between the positive- and negative-electrode-side power lines;

phase relay power switching elements are disposed outward of the high-potential-side power switching elements and the low-potential-side power switching elements;

the output terminals are disposed outward of the phase relay power switching elements; and the phase relay power switching elements are configured to control power supply between the output terminals and connection points of the high-potential-side power switching elements and the low-potential-side power switching elements.

10. The electric driving device according to claim 9, wherein the two negative-electrode-side power lines are each formed in a linear shape so as to divide the mounting substrate;

wherein the two positive-electrode-side power lines each include: a first wiring section extending along the negative-electrode-side power line; a second wiring section extending in a different direction from the first wiring section; and third wiring sections facing the second wiring section via insulating areas and extending along the negative-electrode-side power line;

wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are disposed on the second wiring section and respectively connected to the third wiring sections;

wherein the low-potential-side power switching elements include, as three respective phase low-potential-side power switching elements, a low-potential-side U-phase power switching element, a low-potential-side V-phase power switching element and a low-potential-side W-phase power switching element respectively disposed on the third wiring sections;

wherein the phase relay power switching elements include, as three respective phase relay power switching elements, a U-phase relay power switching element, a V-phase relay power switching element and a W-phase relay power switching element arranged in order of mention along the wiring direction of the negative-electrode-side power line; and wherein the output terminals include, as three respective phase output terminals, a U-phase output terminal, a V-phase output terminal and a W-phase output terminal arranged in order of mention along the wiring direction of the negative-electrode-side power line.

11. An electric power steering device, comprising:
an electric motor arranged to apply a steering assist force to a steering shaft; and
an electronic control unit arranged, on a side opposite to an output shaft of the electric motor, to control the electric motor,
the electronic control unit comprising: an ECU housing coupled to a motor housing in which the electric motor is installed; and an electronic control assembly installed in the ECU housing and configured to perform drive control of the electric motor,
wherein the electronic control assembly comprises:
a power supply circuit portion mounted on a metal substrate and functioning to generate electric power;
a power conversion circuit portion mounted on a metal mounting substrate and functioning to drive the electric motor; and a control circuit portion mounted on a resin substrate and functioning to control the power conversion circuit portion, wherein the power conversion circuit portion comprises at least:

two positive-electrode-side power lines and two negative-electrode-side power lines arranged adjacent to each other on the mounting substrate from an outer peripheral side to an inner side of the mounting substrate;

two power conversion circuits arranged on both sides of the mounting substrate, with respect to the two positive-electrode-side power lines and the two negative-electrode-side power lines, and each configured to drive and control the electric motor; and output terminals arranged on the mounting substrate at a location outward of the power conversion circuits and being connected to the electric motor.

12. The electric power steering device according to claim 11, wherein the power conversion circuit portion is so structured that:

the two positive-electrode-side power lines are arranged to extend from the outer peripheral side to the inner side of the mounting substrate;

the two negative-electrode-side power lines are arranged adjacent to and outward of the two positive-electrode-side power lines;

high-potential-side power switching elements are disposed on each of the two positive-electrode-side power lines;

low-potential-side power switching elements are disposed outward of each of the two negative-electrode-side power lines;

the high-potential-side power switching elements and the low-potential-side power switching elements are respectively connected in series to each other between the positive- and negative-electrode-side power lines;

phase relay power switching elements are disposed outward of the low-potential-side power switching elements;

the output terminals are disposed outward of the phase relay power switching elements; and the phase relay power switching elements are configured to control power supply between the output terminals and connection points of the high-potential-side power switching elements and the low-potential-side power switching elements.

13. The electric power steering device according to claim 12, wherein the two positive-electrode-side power lines and the two negative-electrode-side power lines are each formed in a linear shape so as to divide the mounting substrate;

wherein the high-potential-side power switching elements include, as three respective phase high-potential-side power switching elements, a high-potential-side U-phase power switching element, a high-potential-side V-phase power switching element and a high-potential-side W-phase power switching element configured to respectively control power supplied to a U-phase coil, a V-phase coil and a W-phase coil of the electric motor, such that the three respective phase high-potential-side power switching elements are arranged along a wiring direction of the positive-electrode-side power line;

wherein the low-potential-side power switching elements include, as three respective phase low-potential-side power switching elements, a low-potential-side U-phase power switching element, a low-potential-side V-phase power switching element and a low-potential-side W-phase power switching element connected to the high-potential-side U-phase power switching element, the high-potential-side V-phase power switching element and the high-potential-side W-phase power switching element, respectively, and arranged along the wiring direction of the positive-electrode-side power line;

wherein the phase relay power switching elements include, as three respective phase relay power switching elements, a U-phase relay power switching element, a V-phase relay power switching element and a W-phase relay power switching element arranged along the wiring direction of the positive-electrode-side power line; and wherein the output terminals include, as three respective phase output terminals, a U-phase output terminal, a V-phase output terminal and a W-phase output terminal arranged along the wiring direction of the positive-electrode-side power line.

14. The electric power steering device according to claim 13,
wherein the three respective phase high-potential-side power switching elements on one of the positive-electrode-side power lines are shifted in position in the wiring direction relative to the three respective phase high-potential-side power switching elements on the other of the positive-electrode-side power lines.

15. The electric power steering device according to claim 14,
wherein the three respective phase high-potential-side power switching elements on the one of the positive-electrode-side power lines are connected to the corresponding three respective phase low-potential-side power switching elements by first jumper wires;
wherein the three respective phase high-potential-side power switching elements on the other of the positive-electrode-side power lines are connected to the corresponding three respective phase low-potential-side power switching elements by second jumper wires; and
wherein the first jumper wires and the second jumper wires are substantially symmetrical in position with respect to the positive-electrode-side power lines.

16. The electric power steering device according to claim 13,
wherein the three respective phase high-potential-side power switching elements on the one of the positive-electrode-side power lines are opposed to the three respective phase high-potential-side power switching elements on the other of the positive-electrode-side power lines.

17. The electric power steering device according to claim 16,
wherein the three respective phase high-potential-side power switching elements on the one of the positive-electrode-side power lines are connected to the corresponding three respective phase low-potential-side power switching elements by first jumper wires;
wherein the three respective phase high-potential-side power switching elements on the other of the positive-electrode-side power lines are connected to the corresponding three respective phase low-potential-side power switching elements by second jumper wires; and
wherein the first jumper wires and the second jumper wires are shifted in position relative to each other in the wiring direction of the positive-electrode-side power line.

18. The electric driving device according to claim 2,
wherein the power conversion circuit portion is so structured that:
the two positive-electrode-side power lines are arranged to extend from the outer peripheral side to the inner side of the mounting substrate;
the two negative-electrode-side power lines are arranged adjacent to and outward of the two positive-electrode-side power lines;
high-potential-side power switching elements are disposed on each of the two positive-electrode-side power lines;
low-potential-side power switching elements are disposed outward of each of the two negative-electrode-side power lines;
the high-potential-side power switching elements and the low-potential-side power switching elements are respectively connected in series to each other between the positive and negative-electrode-side power lines;
phase relay power switching elements are disposed outward of the low-potential-side power switching elements;
the output terminals are disposed outward of the phase relay power switching elements; and
the phase relay power switching elements are configured to control power supply between the output terminals and connection points of the high-potential-side power switching elements and the low-potential-side power switching elements.

19. The electric driving device according to claim 18,
wherein the two positive-electrode-side power lines and the two negative-electrode-side power lines are each formed in a linear shape so as to divide the mounting substrate;
wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are arranged along a wiring direction of the positive-electrode-side power line;
wherein the low-potential-side power switching elements include, as three respective phase low-potential-side power switching elements, a low-potential-side U-phase power switching element, a low-potential-side V-phase power switching element and a low-potential-side W-phase power switching element connected to the high-potential-side U-phase power switching element, the high-potential-side V-phase power switching element and the high-potential-side W-phase power switching element, respectively, and arranged along the wiring direction of the positive-electrode-side power line;
wherein the phase relay power switching elements include, as three respective phase relay power switching elements, a U-phase relay power switching element, a V-phase relay power switching element and a W-phase relay power switching element arranged along the wiring direction of the positive-electrode-side power line; and wherein the output terminals include, as three respective phase output terminals, a U-phase output terminal, a V-phase output terminal and a W-phase output terminal arranged along the wiring direction of the positive-electrode-side power line.

20. The electric driving device according to claim 2, wherein the power conversion circuit portion is so structured that:

the two negative-electrode-side power lines are arranged to extend from the outer peripheral side to the inner side of the mounting substrate;

the two positive-electrode-side power lines are arranged adjacent to and outward of the two negative-electrode-side power lines;

high-potential-side power switching elements are disposed on each of the two positive-electrode-side power lines;

low-potential-side power switching elements are disposed along each of the two negative-electrode-side power lines;

the high-potential-side power switching elements and the low-potential-side power switching elements are respectively connected in series to each other between the positive- and negative-electrode-side power lines;

phase relay power switching elements are disposed outward of the high-potential-side power switching elements and the low-potential-side power switching elements;

the output terminals are disposed outward of the phase relay power switching elements; and the phase relay power switching elements are configured to control power supply between the output terminals and connection points of the high-potential-side power switching elements and the low-potential-side power switching elements.

21. The electric driving device according to claim 20, wherein the two negative-electrode-side power lines are each formed in a linear shape so as to divide the mounting substrate;

wherein the two positive-electrode-side power lines each include: a first wiring section extending along the negative-electrode-side power line; a second wiring section extending in a different direction from the first wiring section; and third wiring sections facing the second wiring section via insulating areas and extending along the negative-electrode-side power line;

wherein the high-potential-side power switching elements include, as three respective phase high-potential-side power switching elements, a high-potential-side U-phase power switching element, a high-potential-side V-phase power switching element and a high-potential-side W-phase power switching element configured to control power supplied to a U-phase coil, a V-phase coil and a W-phase coil of the electric motor, respectively, the three respective phase high-potential-side power switching elements are disposed on the second wiring section and respectively connected to the third wiring sections;

wherein the low-potential-side power switching elements include, as three respective phase low-potential-side power switching elements, a low-potential-side U-phase power switching element, a low-potential-side V-phase power switching element and a low-potential-side W-phase power switching element respectively disposed on the third wiring sections;

wherein the phase relay power switching elements include, as three respective phase relay power switching elements, a U-phase relay power switching element, a V-phase relay power switching element and a W-phase relay power switching element arranged in order of mention along the wiring direction of the negative-electrode-side power line; and wherein the output terminals include, as three respective phase output terminals, a U-phase output terminal, a V-phase output terminal and a W-phase output terminal arranged in order of mention along the wiring direction of the negative-electrode-side power line.

* * * * *